US012571988B2

(12) United States Patent
Lin et al.

(10) Patent No.:　US 12,571,988 B2
(45) Date of Patent:　Mar. 10, 2026

(54) OPTICAL IMAGING LENS INCLUDING FIVE LENSES OF +-++-, +-+--, +--+- AND -++-- REFRACTIVE POWERS

(71) Applicant: Genius Electronic Optical (Xiamen) Co., Ltd., Xiamen (CN)

(72) Inventors: Maozong Lin, Xiamen (CN); Baina Chen, Xiamen (CN); Jianpeng Li, Xiamen (CN)

(73) Assignee: Genius Electronic Optical (Xiamen) Co., Ltd.

( * ) Notice: Subject to any disclaimer, the term of this patent is extended or adjusted under 35 U.S.C. 154(b) by 508 days.

(21) Appl. No.: 18/079,009

(22) Filed: Dec. 12, 2022

(65) Prior Publication Data

US 2024/0094502 A1　Mar. 21, 2024

(30) Foreign Application Priority Data

Sep. 15, 2022　(CN) .......................... 202211120269.4

(51) Int. Cl.
G02B 9/60　　　(2006.01)
G02B 13/00　　(2006.01)
(52) U.S. Cl.
CPC ........... G02B 9/60 (2013.01); G02B 13/0045 (2013.01)

(58) Field of Classification Search
CPC .............................. G02B 9/60; G02B 13/0045
See application file for complete search history.

(56) References Cited

U.S. PATENT DOCUMENTS

2022/0075163 A1* 3/2022 Tang .................... G02B 15/143

FOREIGN PATENT DOCUMENTS

| CN | 114527556 A | 5/2022 |
| EA | 2011/086827 A1 | 7/2011 |
| TW | I707172 B | 10/2020 |
| WO | 2015/005417 A1 | 1/2015 |

* cited by examiner

*Primary Examiner* — Wen Huang
(74) *Attorney, Agent, or Firm* — Winston Hsu

(57) ABSTRACT

An optical imaging lens includes a first lens element, a second lens element, a third lens element, a fourth lens element and a fifth lens element in sequence along an optical axis from an object side to an image side. When the object moves from infinity to macro, the optical imaging lens correspondingly forms a first focusing state and a second focusing state to achieve the focusing purpose. The fifth lens element has negative refracting power, an optical axis region of the object-side surface of the fifth lens element is concave, and an optical axis region of the image-side surface of the fifth lens element is concave. Lens elements included by the optical imaging lens are only five lens elements, and (TTL*ΔHFOV)/ΔG≤19.000 degrees is satisfied.

18 Claims, 36 Drawing Sheets

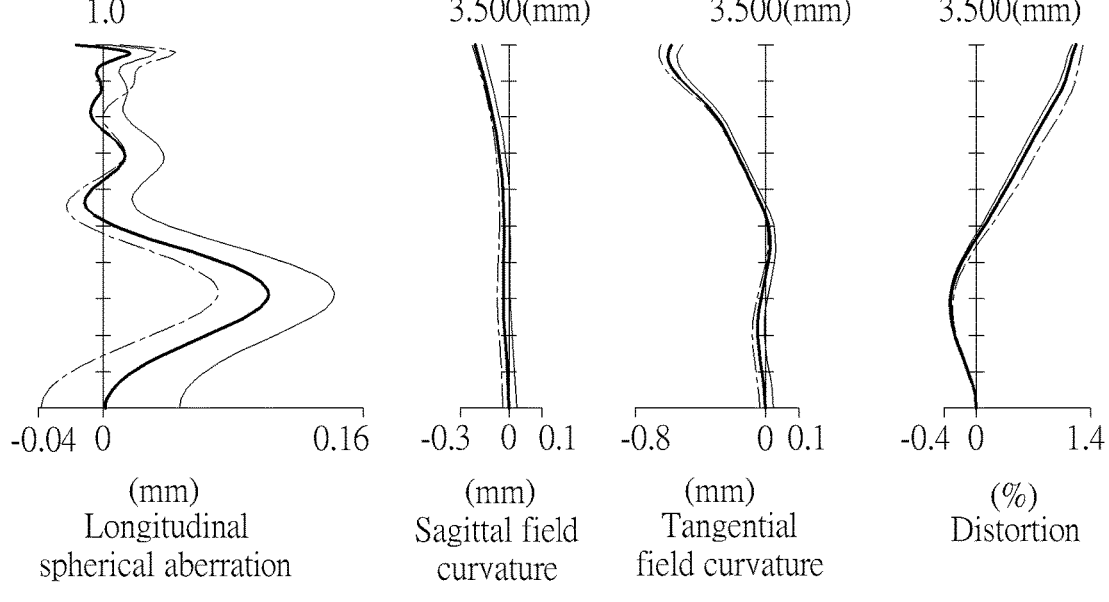

650nm
555nm
470nm

Field of view
1.0

-0.05    0    0.08
(mm)
Longitudinal
spherical aberration

FIG. 7A

Image Height
3.500(mm)

-0.3  0  0.05
(mm)
Sagittal field
curvature

FIG. 7B

Image Height
3.500(mm)

-0.45  0  0.05
(mm)
Tangential
field curvature

FIG. 7C

Image Height
3.500(mm)

-0.5    0    0.5
(%)
Distortion

Field of view
1.0

-0.04  0    0.16
(mm)
Longitudinal
spherical aberration

FIG. 7E

Image Height
3.500(mm)

-0.3  0  0.1
(mm)
Sagittal field
curvature

FIG. 7F

Image Height
3.500(mm)

-0.8    0  0.1
(mm)
Tangential
field curvature

FIG. 7G

Image Height
3.500(mm)

-0.4 0    1.4
(%)
Distortion

FIG. 7H

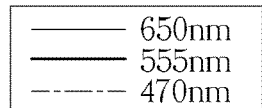
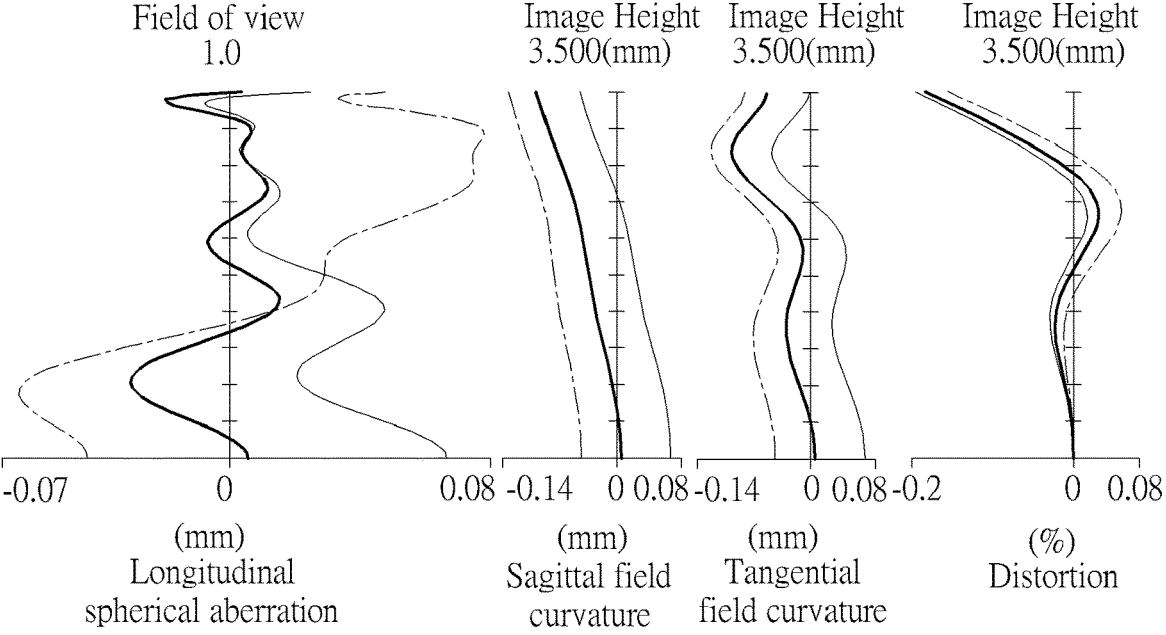
Field of view
1.0
Image Height
3.500(mm)
Image Height
3.500(mm)
Image Height
3.500(mm)
-0.07        0        0.08 -0.14   0 0.08 -0.14   0 0.08 -0.2        0   0.08
(mm)
Longitudinal
spherical aberration
(mm)
Sagittal field
curvature
(mm)
Tangential
field curvature
(%)
Distortion
FIG. 9A        FIG. 9B  FIG. 9C    FIG. 9D
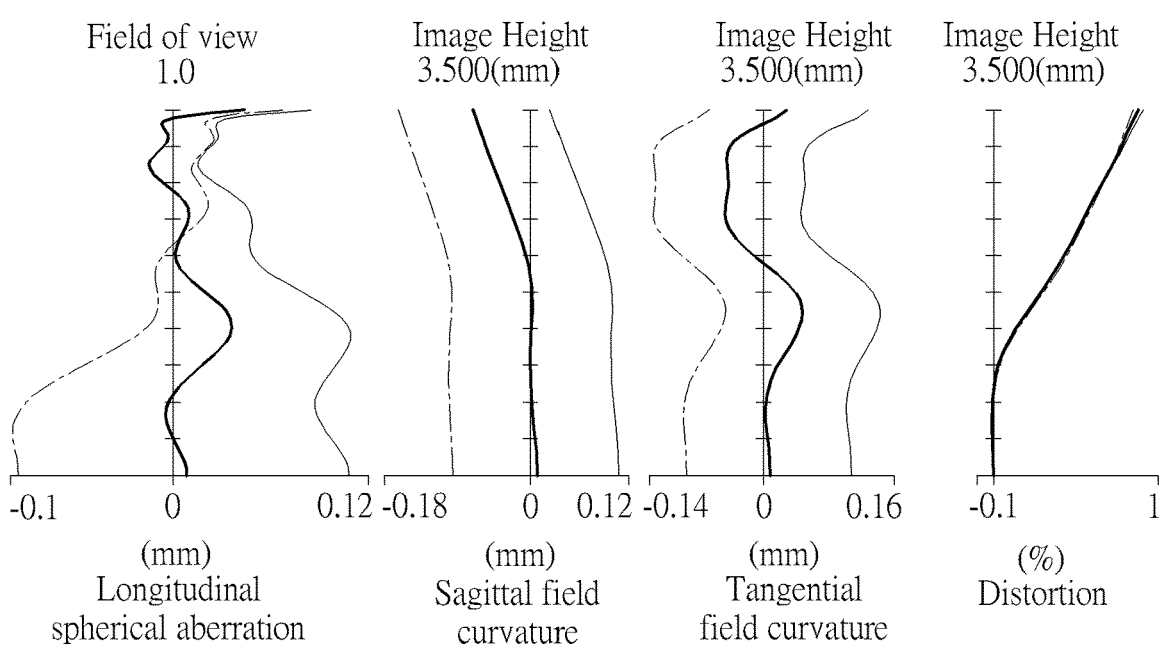
Field of view
1.0
Image Height
3.500(mm)
Image Height
3.500(mm)
Image Height
3.500(mm)
-0.1        0        0.12 -0.18        0    0.12 -0.14        0        0.16 -0.1        1
(mm)
Longitudinal
spherical aberration
(mm)
Sagittal field
curvature
(mm)
Tangential
field curvature
(%)
Distortion
FIG. 9E        FIG. 9F        FIG. 9G        FIG. 9H

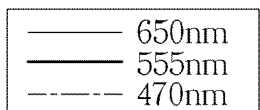
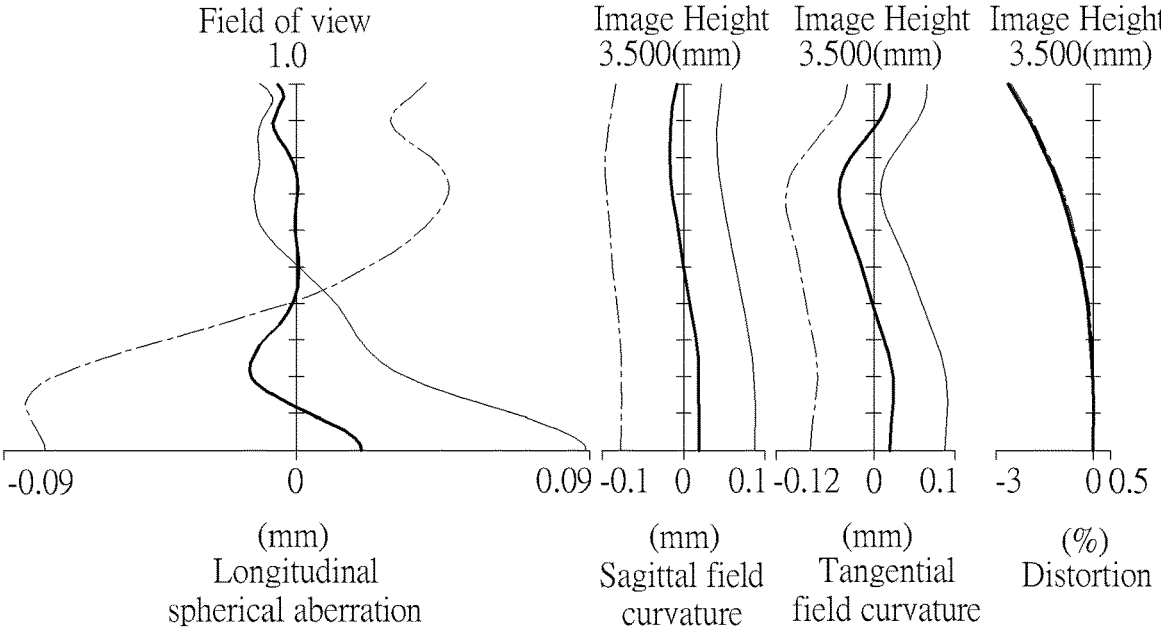
FIG. 13A     FIG. 13B FIG. 13CFIG. 13D
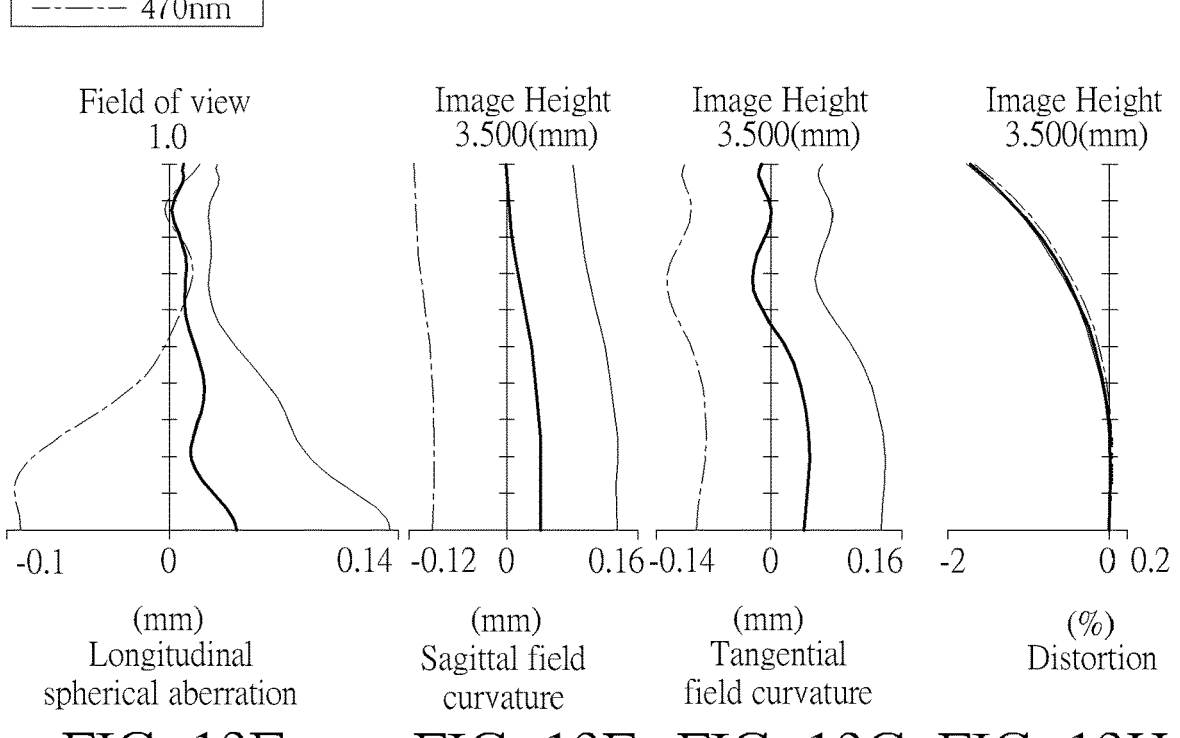
FIG. 13E     FIG. 13F  FIG. 13G  FIG. 13H

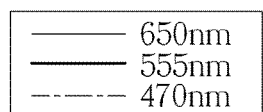
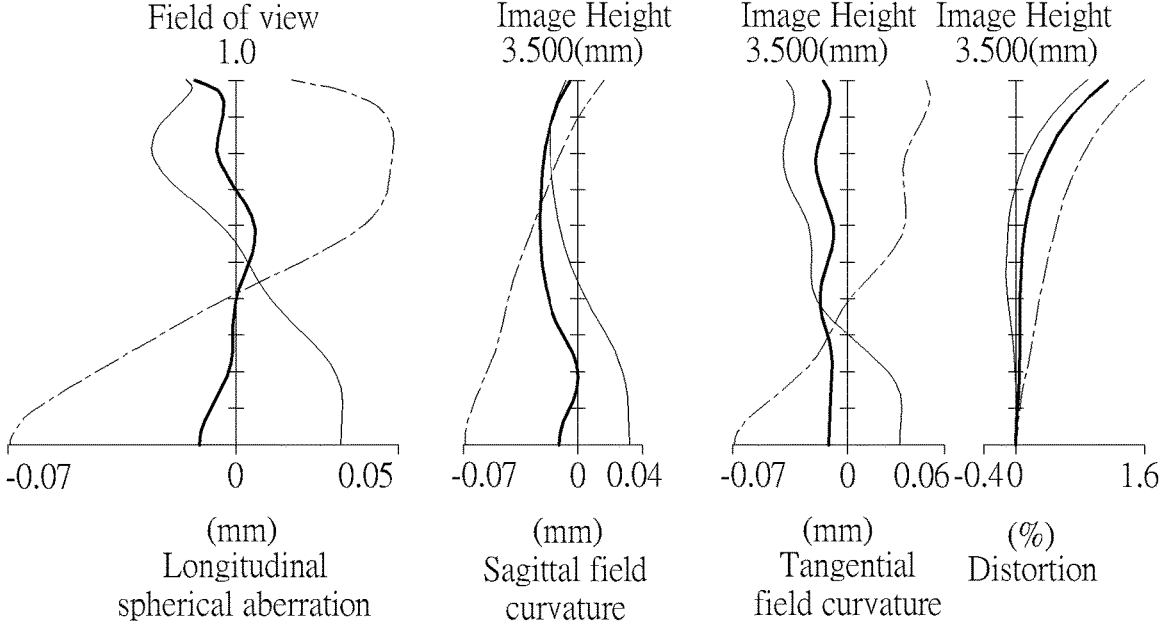
FIG. 15A       FIG. 15B FIG. 15C FIG. 15D
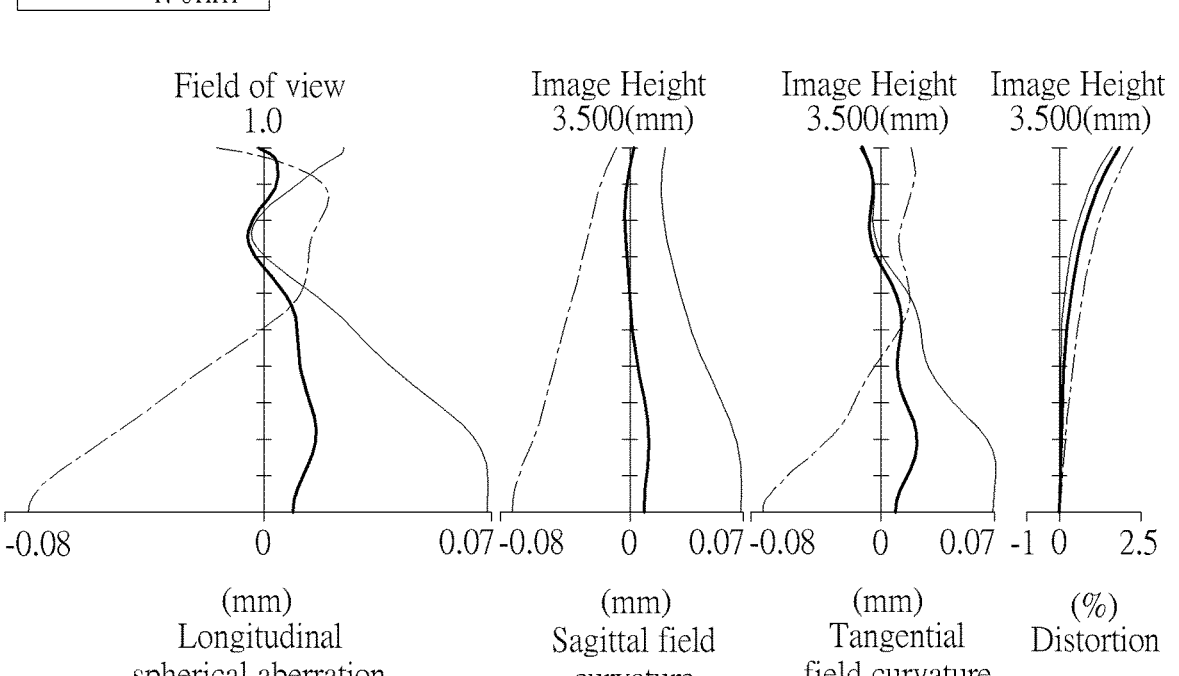
FIG. 15E       FIG. 15F FIG. 15G FIG. 15H

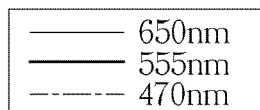
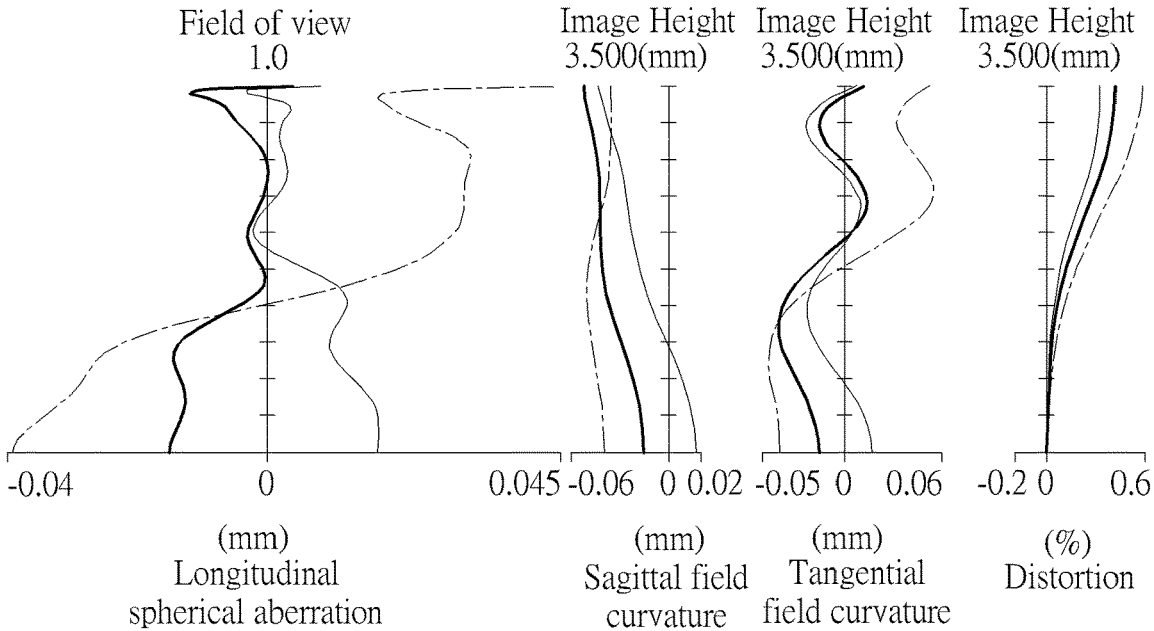
FIG. 17A        FIG. 17BFIG. 17CFIG. 17D
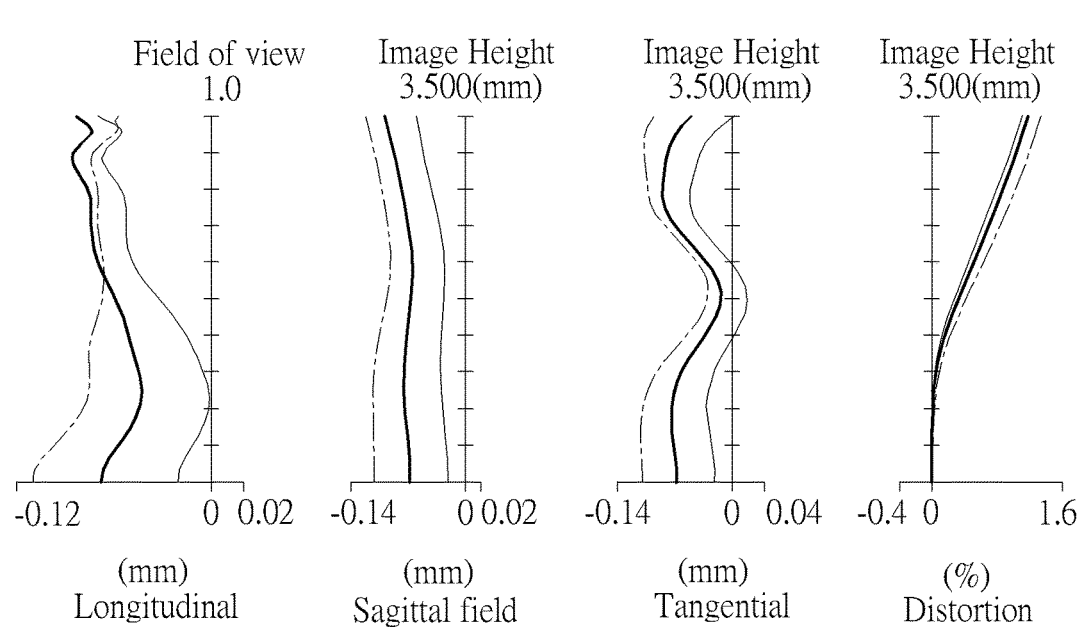
FIG. 17E        FIG. 17F        FIG. 17G        FIG. 17H

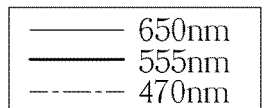
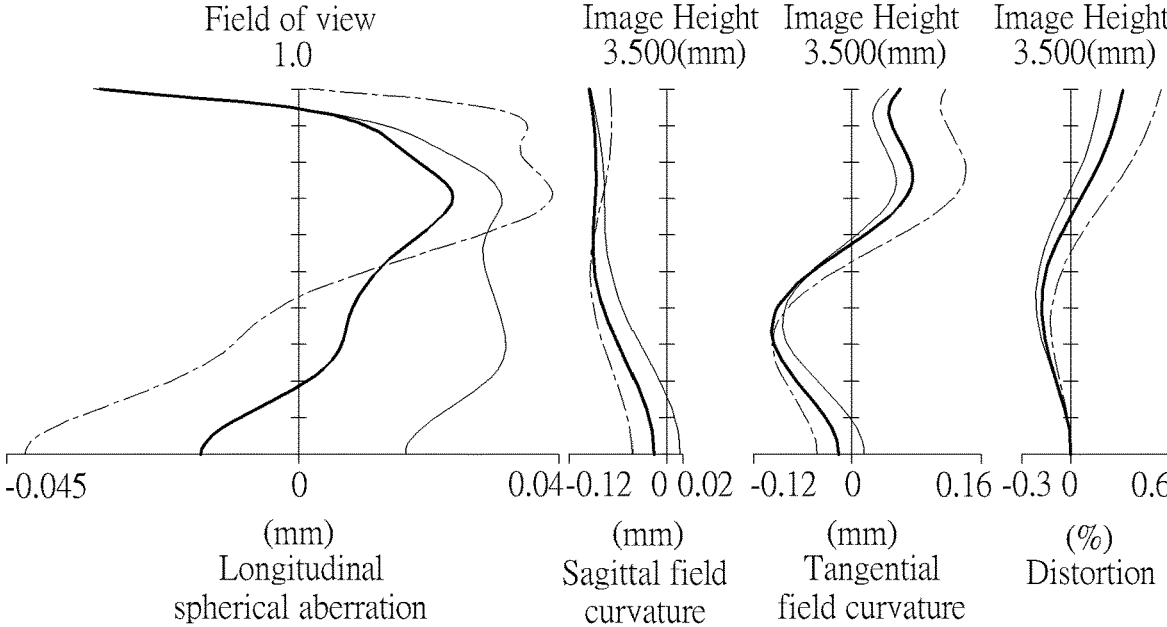
FIG. 19A    FIG. 19B FIG. 19C FIG. 19D
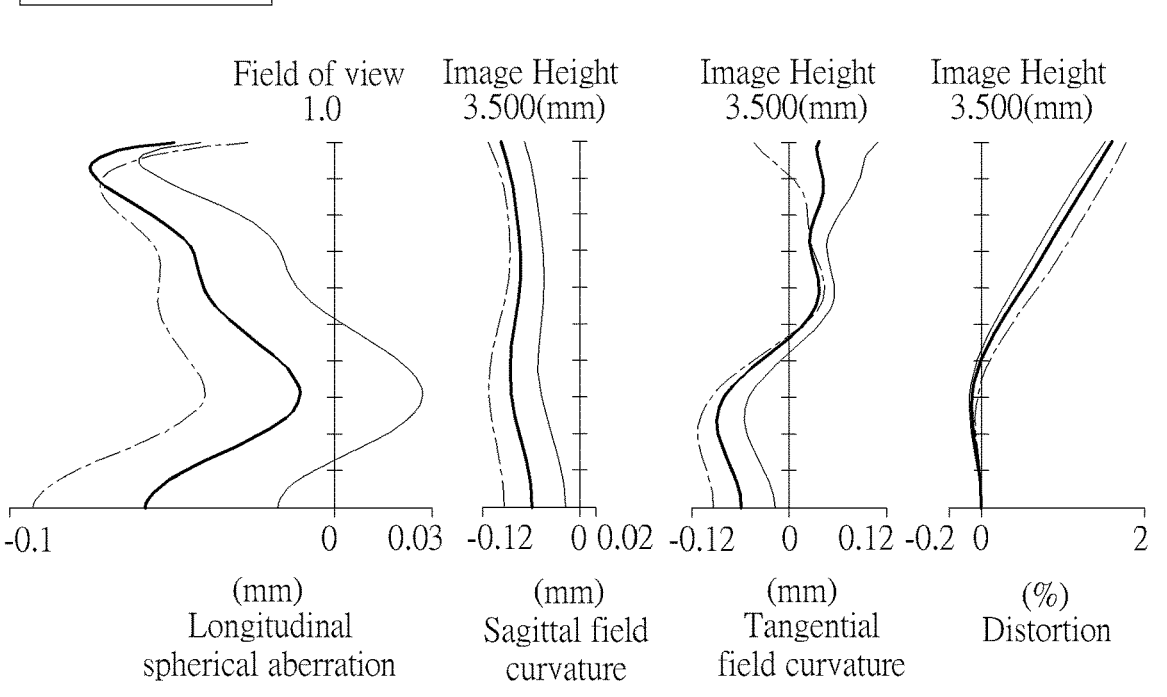
FIG. 19E    FIG. 19F FIG. 19G  FIG. 19H

| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
|---|---|---|---|---|---|---|---|---|---|
| First Embodiment | | | | | | | | | |
| EFL=13.873mm, EFLA=9.629mm, Fno of the first focusing state=3.089, Fno of the second focusing state=2.144, HFOV of the first focusing state=14.080degrees, HFOV of the second focusing state=13.522degrees, TTL=14.335mm, ImgH=3.500mm | | | | | | | | | |
| | Object | Infinity | Infinity | | 48.697 | | | | |
| 2 | Ape. Stop | Infinity | 0.100 | | 0.100 | | | | |
| 11 | First lens element | 4.693 | 2.014 | T1 | 2.014 | T1 | 1.545 | 55.987 | 14.188 |
| 12 | | 10.094 | 0.483 | G12 | 0.483 | G12 | | | |
| 21 | Second lens element | 5.316 | 0.348 | T2 | 0.348 | T2 | 1.640 | 23.529 | -10.152 |
| 22 | | 2.858 | 0.517 | G23 | 0.517 | G23 | | | |
| 31 | Third lens element | 16.434 | 1.089 | T3 | 1.089 | T3 | 1.545 | 55.987 | 5.996 |
| 32 | | -3.995 | 1.091 | G34 | 3.548 | G34 | | | |
| 41 | Fourth lens element | -7.830 | 0.744 | T4 | 0.744 | T4 | 1.640 | 23.529 | 23.372 |
| 42 | | -5.344 | 0.572 | G45 | 0.572 | G45 | | | |
| 51 | Fifth lens element | -4.646 | 0.925 | T5 | 0.925 | T5 | 1.545 | 55.987 | -6.882 |
| 52 | | 21.094 | 5.194 | G5F | 2.736 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

FIG. 22

| No. | K | $a_4$ | $a_6$ | $a_8$ | $a_{10}$ |
|---|---|---|---|---|---|
| 11 | 3.206679E-01 | -1.060126E-03 | 8.049614E-04 | -6.708094E-04 | 2.227010E-04 |
| 12 | 1.356847E+00 | -2.000866E-03 | 3.400097E-02 | -5.713496E-02 | 4.723191E-02 |
| 21 | -4.854020E+00 | -1.786719E-02 | 3.096952E-02 | -5.785636E-02 | 5.120260E-02 |
| 22 | 3.283068E-01 | -1.849778E-02 | -1.207027E-03 | -9.637925E-03 | 1.248148E-02 |
| 31 | -5.897214E+00 | 2.779481E-03 | -4.947093E-03 | 3.616420E-03 | -3.411053E-03 |
| 32 | 1.073110E+00 | 8.547569E-04 | -4.712400E-03 | 5.405649E-03 | -4.117997E-03 |
| 41 | -2.377156E+00 | 2.351088E-02 | -1.258174E-02 | 1.590856E-02 | -1.236953E-02 |
| 42 | -1.227320E+01 | 1.696332E-02 | -4.386292E-03 | 4.887814E-03 | -2.720106E-03 |
| 51 | -1.238731E-01 | 7.675088E-04 | -2.821107E-03 | -1.391653E-03 | 2.584988E-03 |
| 52 | -9.518877E+02 | -1.802396E-03 | -1.410498E-03 | -5.342526E-04 | 6.384690E-04 |
| No. | $a_{12}$ | $a_{14}$ | $a_{16}$ | $a_{18}$ | $a_{20}$ |
| 11 | -3.346734E-06 | -1.818517E-05 | 5.248050E-06 | -6.240289E-07 | 2.811275E-08 |
| 12 | -2.213966E-02 | 6.203104E-03 | -1.027708E-03 | 9.303911E-05 | -3.567001E-06 |
| 21 | -2.514960E-02 | 7.317777E-03 | -1.257739E-03 | 1.185248E-04 | -4.774189E-06 |
| 22 | -6.922357E-03 | 2.051000E-03 | -3.272040E-04 | 2.456723E-05 | -5.389516E-07 |
| 31 | 2.421455E-03 | -1.060918E-03 | 2.732837E-04 | -3.788618E-05 | 2.145825E-06 |
| 32 | 1.968649E-03 | -5.942965E-04 | 1.098603E-04 | -1.134442E-05 | 4.893472E-07 |
| 41 | 6.293680E-03 | -2.134490E-03 | 4.628782E-04 | -5.741174E-05 | 3.070572E-06 |
| 42 | 1.236300E-03 | -6.660753E-04 | 2.593998E-04 | -5.226164E-05 | 4.095537E-06 |
| 51 | -1.212392E-03 | -1.757591E-04 | 2.947192E-04 | -8.369634E-05 | 7.778643E-06 |
| 52 | -2.878866E-04 | 7.483231E-05 | -1.154332E-05 | 9.796705E-07 | -3.494054E-08 |

FIG. 23

| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
|---|---|---|---|---|---|---|---|---|---|
| | | | | | | | | | |
| | Object | Infinity | Infinity | | 48.697 | | | | |
| 2 | Ape. Stop | Infinity | 0.524 | | 0.524 | | | | |
| 11 | First lens element | 4.512 | 1.317 | T1 | 1.317 | T1 | 1.523 | 54.517 | 14.809 |
| 12 | | 9.668 | 0.059 | G12 | 0.059 | G12 | | | |
| 21 | Second lens element | 5.468 | 0.499 | T2 | 0.499 | T2 | 1.587 | 30.611 | -10.145 |
| 22 | | 2.761 | 0.452 | G23 | 0.452 | G23 | | | |
| 31 | Third lens element | 10.927 | 1.920 | T3 | 1.920 | T3 | 1.544 | 49.922 | 6.000 |
| 32 | | -4.393 | 1.100 | G34 | 3.455 | G34 | | | |
| 41 | Fourth lens element | -12.205 | 0.985 | T4 | 0.985 | T4 | 1.587 | 30.611 | -100.255 |
| 42 | | -15.839 | 0.412 | G45 | 0.412 | G45 | | | |
| 51 | Fifth lens element | -500.173 | 1.054 | T5 | 1.054 | T5 | 1.523 | 54.517 | -11.300 |
| 52 | | 6.009 | 5.202 | G5F | 2.847 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

Second Embodiment

EFL=13.299mm, EFLA=9.433mm, Fno of the first focusing state=3.072, Fno of the second focusing state=2.235, HFOV of the first focusing state=14.769degrees, HFOV of the second focusing state=14.386degrees, TTL=14.357mm, ImgH=3.500mm

FIG. 24

| No. | K | $a_4$ | $a_6$ | $a_8$ | $a_{10}$ |
|---|---|---|---|---|---|
| 11 | 6.608799E-02 | -1.899408E-03 | 6.716653E-04 | -6.946910E-04 | 2.212432E-04 |
| 12 | -1.616271E+02 | -1.456485E-02 | 3.457037E-02 | -5.713582E-02 | 4.720947E-02 |
| 21 | -3.097919E+01 | -2.247863E-02 | 3.095172E-02 | -5.777747E-02 | 5.120420E-02 |
| 22 | 2.450920E-01 | -1.451895E-02 | -2.098152E-03 | -9.872312E-03 | 1.247844E-02 |
| 31 | 1.179608E+01 | 6.248345E-03 | -5.275847E-03 | 3.543780E-03 | -3.441772E-03 |
| 32 | 5.262926E-01 | 3.103036E-03 | -4.606822E-03 | 5.443992E-03 | -4.125098E-03 |
| 41 | -1.382099E+01 | 1.949756E-02 | -1.169991E-02 | 1.460348E-02 | -1.198739E-02 |
| 42 | -2.697679E+02 | 1.045154E-02 | -3.776679E-03 | 5.411958E-03 | -3.663425E-03 |
| 51 | 6.068767E+04 | -2.109515E-02 | -5.764465E-04 | -1.124140E-03 | 2.511113E-03 |
| 52 | -2.207367E+01 | -1.243105E-02 | 6.446108E-05 | 1.818080E-04 | 8.411272E-05 |
| No. | $a_{12}$ | $a_{14}$ | $a_{16}$ | $a_{18}$ | $a_{20}$ |
| 11 | -3.543407E-06 | -1.817973E-05 | 5.232823E-06 | -6.283283E-07 | 2.930229E-08 |
| 12 | -2.214806E-02 | 6.197860E-03 | -1.027518E-03 | 9.330315E-05 | -3.570933E-06 |
| 21 | -2.515439E-02 | 7.316471E-03 | -1.257961E-03 | 1.185431E-04 | -4.725804E-06 |
| 22 | -6.920961E-03 | 2.051926E-03 | -3.272116E-04 | 2.458650E-05 | -4.961007E-07 |
| 31 | 2.409802E-03 | -1.061968E-03 | 2.735588E-04 | -3.773839E-05 | 2.191711E-06 |
| 32 | 1.968762E-03 | -5.941745E-04 | 1.098513E-04 | -1.134096E-05 | 5.008452E-07 |
| 41 | 6.343865E-03 | -2.167064E-03 | 4.650601E-04 | -5.716596E-05 | 3.072884E-06 |
| 42 | 1.827104E-03 | -8.781235E-04 | 3.398557E-04 | -7.539100E-05 | 6.838735E-06 |
| 51 | -1.230041E-03 | -1.168613E-04 | 2.751791E-04 | -8.316032E-05 | 8.217983E-06 |
| 52 | -1.026852E-04 | 4.020448E-05 | -8.153970E-06 | 8.565714E-07 | -3.681120E-08 |

FIG. 25

| | | | First focusing state | | Second focusing state | | | | |
|---|---|---|---|---|---|---|---|---|---|
| No. | | Radius of Curvature (mm) | Ape. Stop Distance Thickness Air Gap (mm) | | Ape. Stop Distance Thickness Air Gap (mm) | | Refractive Index | Abbe No. | Focal Length (mm) |
| | Object | Infinity | Infinity | | 48.697 | | | | |
| 2 | Ape. Stop | Infinity | -0.030 | | -0.030 | | | | |
| 11 | First lens element | 3.299 | 1.451 | T1 | 1.451 | T1 | 1.545 | 55.987 | 4.525 |
| 12 | | -8.332 | 0.050 | G12 | 0.050 | G12 | | | |
| 21 | Second lens element | -11.647 | 0.480 | T2 | 0.480 | T2 | 1.640 | 23.529 | -9.827 |
| 22 | | 14.110 | 0.386 | G23 | 0.386 | G23 | | | |
| 31 | Third lens element | -9.106 | 1.492 | T3 | 1.492 | T3 | 1.545 | 55.987 | -1000.001 |
| 32 | | -9.796 | 0.153 | G34 | 2.993 | G34 | | | |
| 41 | Fourth lens element | -8.807 | 1.077 | T4 | 1.077 | T4 | 1.640 | 23.529 | 15.190 |
| 42 | | -4.859 | 0.198 | G45 | 0.198 | G45 | | | |
| 51 | Fifth lens element | -26.400 | 0.975 | T5 | 0.975 | T5 | 1.545 | 55.987 | -5.752 |
| 52 | | 3.613 | 3.932 | G5F | 1.092 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

Third Embodiment

EFL=11.986mm, EFLA=8.097mm, Fno of the first focusing state=3.070,
Fno of the second focusing state=2.074, HFOV of the first focusing state=15.440degrees,
HFOV of the second focusing state=14.925degrees, TTL=11.552mm, ImgH=3.500mm

FIG. 26

| No. | K | $a_4$ | $a_6$ | $a_8$ | $a_{10}$ |
|---|---|---|---|---|---|
| 11 | 2.808972E-01 | -1.810356E-03 | 8.541343E-04 | -7.135236E-04 | 2.082396E-04 |
| 12 | 1.081291E+00 | -7.315780E-03 | 3.398300E-02 | -5.721890E-02 | 4.721511E-02 |
| 21 | -4.053052E+01 | -1.590413E-02 | 3.124917E-02 | -5.782995E-02 | 5.118007E-02 |
| 22 | 2.266266E+01 | -7.052820E-03 | -7.139886E-04 | -1.005230E-02 | 1.249790E-02 |
| 31 | -4.702965E+01 | -1.992224E-03 | -5.351926E-03 | 4.389577E-03 | -3.415658E-03 |
| 32 | -1.382537E+01 | 9.796496E-03 | -3.019805E-03 | 5.174052E-03 | -4.041970E-03 |
| 41 | 1.510796E+01 | 2.230009E-02 | -9.710789E-03 | 1.373051E-02 | -1.193702E-02 |
| 42 | -2.080063E+01 | 1.643684E-02 | -6.004039E-03 | 5.051456E-03 | -3.680397E-03 |
| 51 | 5.000000E+01 | -4.322906E-04 | -6.550314E-03 | -6.390627E-04 | 2.379432E-03 |
| 52 | -8.949033E+00 | -9.565880E-03 | 4.319708E-04 | 2.368550E-05 | 9.027341E-05 |
| No. | $a_{12}$ | $a_{14}$ | $a_{16}$ | $a_{18}$ | $a_{20}$ |
| 11 | -4.709250E-06 | -1.789840E-05 | 5.358633E-06 | -6.295961E-07 | 7.314484E-09 |
| 12 | -2.214529E-02 | 6.197711E-03 | -1.027846E-03 | 9.322322E-05 | -3.556512E-06 |
| 21 | -2.515782E-02 | 7.317070E-03 | -1.257501E-03 | 1.186279E-04 | -4.762680E-06 |
| 22 | -6.899292E-03 | 2.054873E-03 | -3.284386E-04 | 2.397486E-05 | -4.315455E-07 |
| 31 | 2.358658E-03 | -1.072896E-03 | 2.759217E-04 | -3.619421E-05 | 1.766140E-06 |
| 32 | 2.033179E-03 | -5.929987E-04 | 9.760313E-05 | -1.647644E-05 | 3.114289E-06 |
| 41 | 6.381309E-03 | -2.162538E-03 | 4.638832E-04 | -5.768757E-05 | 3.168913E-06 |
| 42 | 1.820499E-03 | -8.759304E-04 | 3.403181E-04 | -7.559559E-05 | 6.891802E-06 |
| 51 | -1.222122E-03 | -1.124285E-04 | 2.730605E-04 | -8.417918E-05 | 8.574635E-06 |
| 52 | -1.003145E-04 | 4.078077E-05 | -8.248380E-06 | 8.384601E-07 | -3.420922E-08 |

FIG. 27

| | | | Fourth Embodiment | | | | | |
|---|---|---|---|---|---|---|---|---|
| | | EFL=9.773mm, EFLA=7.655mm, Fno of the first focusing state=3.070, Fno of the second focusing state=2.405, HFOV of the first focusing state=20.235degrees, HFOV of the second focusing state=20.182degrees, TTL=12.236mm, ImgH=3.500mm | | | | | | |
| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
| | Object | Infinity | Infinity | | 48.697 | | | | |
| 2 | Ape. Stop | Infinity | 0.240 | | 0.240 | | | | |
| 11 | First lens element | 4.738 | 0.638 | T1 | 0.638 | T1 | 1.545 | 55.987 | -33.312 |
| 12 | | 3.580 | 0.050 | G12 | 0.050 | G12 | | | |
| 21 | Second lens element | 2.356 | 0.567 | T2 | 0.567 | T2 | 1.640 | 23.529 | 999.966 |
| 22 | | 2.142 | 0.397 | G23 | 0.397 | G23 | | | |
| 31 | Third lens element | 8.300 | 2.508 | T3 | 2.508 | T3 | 1.545 | 55.987 | 4.089 |
| 32 | | -2.730 | 0.561 | G34 | 1.358 | G34 | | | |
| 41 | Fourth lens element | -5.041 | 1.301 | T4 | 1.301 | T4 | 1.640 | 23.529 | -48.237 |
| 42 | | -6.625 | 0.286 | G45 | 0.286 | G45 | | | |
| 51 | Fifth lens element | -1000.000 | 1.595 | T5 | 1.595 | T5 | 1.545 | 55.987 | -7.002 |
| 52 | | 3.842 | 2.975 | G5F | 2.178 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

FIG. 28

| No. | K | $a_4$ | $a_6$ | $a_8$ | $a_{10}$ |
|---|---|---|---|---|---|
| 11 | 1.959211E+00 | 2.934677E-03 | 1.113939E-03 | -5.743025E-04 | 4.140726E-04 |
| 12 | -4.149746E+01 | -1.617843E-02 | 4.499492E-02 | -5.703132E-02 | 4.689332E-02 |
| 21 | -1.293832E+01 | -1.589210E-02 | 3.122387E-02 | -5.676527E-02 | 5.135663E-02 |
| 22 | -5.473034E-04 | -3.831928E-02 | 2.252385E-03 | -9.397260E-03 | 1.249713E-02 |
| 31 | -3.171589E+01 | -2.343272E-03 | -5.106713E-03 | 3.473292E-03 | -3.259102E-03 |
| 32 | 5.852792E-01 | 5.814521E-03 | -4.044581E-03 | 5.425017E-03 | -4.077703E-03 |
| 41 | 5.257400E+00 | 3.577737E-02 | -1.280858E-02 | 1.475384E-02 | -1.184315E-02 |
| 42 | -3.111191E+01 | 1.000551E-02 | -2.915757E-03 | 5.702346E-03 | -3.642434E-03 |
| 51 | -7.126030E-10 | -3.075707E-02 | 2.177676E-03 | -1.110253E-03 | 2.413436E-03 |
| 52 | -1.087591E+01 | -1.596551E-02 | 1.295204E-03 | 1.105175E-04 | 5.815582E-05 |
| No. | $a_{12}$ | $a_{14}$ | $a_{16}$ | $a_{18}$ | $a_{20}$ |
| 11 | 1.812464E-05 | -2.787056E-05 | 1.555536E-06 | -6.168446E-07 | 4.537608E-07 |
| 12 | -2.208915E-02 | 6.236487E-03 | -1.027351E-03 | 8.673334E-05 | -4.064513E-06 |
| 21 | -2.526231E-02 | 7.271228E-03 | -1.258645E-03 | 1.214933E-04 | -6.756109E-06 |
| 22 | -6.871316E-03 | 2.044331E-03 | -3.510987E-04 | 1.457512E-05 | 3.545168E-06 |
| 31 | 2.456835E-03 | -1.052501E-03 | 2.794452E-04 | -3.660984E-05 | -1.254480E-06 |
| 32 | 1.973969E-03 | -5.952994E-04 | 1.096011E-04 | -1.128557E-05 | 5.186643E-07 |
| 41 | 6.336341E-03 | -2.173516E-03 | 4.646761E-04 | -5.690829E-05 | 3.143113E-06 |
| 42 | 1.806167E-03 | -8.803355E-04 | 3.401965E-04 | -7.559426E-05 | 6.891802E-06 |
| 51 | -1.198945E-03 | -1.132790E-04 | 2.741925E-04 | -8.479881E-05 | 8.574634E-06 |
| 52 | -1.017455E-04 | 4.141736E-05 | -8.203923E-06 | 8.213365E-07 | -3.329735E-08 |

FIG. 29

| | | | Fifth Embodiment | | | | | | |
|---|---|---|---|---|---|---|---|---|---|
| | | EFL=8.036mm, EFLA=6.832mm, Fno of the first focusing state=3.070,<br>Fno of the second focusing state=2.610, HFOV of the first focusing state=23.279degrees,<br>HFOV of the second focusing state=23.067degrees, TTL=10.807mm, ImgH=3.500mm | | | | | | | |
| No. | | Radius of<br>Curvature<br>(mm) | First focusing state<br>Ape. Stop Distance<br>Thickness<br>Air Gap<br>(mm) | | Second focusing state<br>Ape. Stop Distance<br>Thickness<br>Air Gap<br>(mm) | | Refractive<br>Index | Abbe No. | Focal<br>Length<br>(mm) |
| | Object | Infinity | Infinity | | 48.697 | | | | |
| 2 | Ape. Stop | Infinity | 0.050 | | 0.050 | | | | |
| 11 | First lens element | -48.123 | 1.045 | T1 | 1.045 | T1 | 1.545 | 55.987 | 13.773 |
| 12 | | -6.556 | 0.461 | G12 | 0.461 | G12 | | | |
| 21 | Second lens element | 1.842 | 0.337 | T2 | 0.337 | T2 | 1.640 | 23.529 | -24.072 |
| 22 | | 1.528 | 0.913 | G23 | 0.913 | G23 | | | |
| 31 | Third lens element | 17.283 | 1.013 | T3 | 1.013 | T3 | 1.545 | 55.987 | 3.769 |
| 32 | | -2.289 | 0.151 | G34 | 0.557 | G34 | | | |
| 41 | Fourth lens element | -2.121 | 1.044 | T4 | 1.044 | T4 | 1.640 | 23.529 | 60.436 |
| 42 | | -2.399 | 0.100 | G45 | 0.100 | G45 | | | |
| 51 | Fifth lens element | -1000.000 | 1.321 | T5 | 1.321 | T5 | 1.545 | 55.987 | -5.234 |
| 52 | | 2.869 | 3.063 | G5F | 2.657 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

FIG. 30

| No. | K | $a_4$ | $a_6$ | $a_8$ | $a_{10}$ |
|---|---|---|---|---|---|
| 11 | 4.996877E+01 | -2.631028E-03 | 2.463488E-03 | -2.510224E-03 | 3.628325E-04 |
| 12 | 1.453076E+01 | -4.162408E-02 | 5.769675E-02 | -5.925252E-02 | 4.407381E-02 |
| 21 | -4.589954E+00 | -1.028791E-01 | 2.770260E-02 | -4.850669E-02 | 4.743895E-02 |
| 22 | -3.844922E+00 | -7.298938E-02 | 2.588385E-05 | -7.366004E-03 | 1.233867E-02 |
| 31 | -4.999787E+01 | -1.038741E-02 | -2.329357E-03 | 2.096118E-03 | -3.658092E-03 |
| 32 | 3.195093E-01 | 7.643137E-03 | -3.620465E-03 | 5.274137E-03 | -4.149401E-03 |
| 41 | -4.893613E+00 | 3.503624E-02 | -1.379429E-02 | 1.399629E-02 | -1.172691E-02 |
| 42 | -6.492055E+00 | 2.827020E-02 | -6.094672E-03 | 5.351186E-03 | -3.445339E-03 |
| 51 | -5.000000E+01 | -3.297715E-02 | -5.899475E-03 | 1.687902E-03 | 2.043264E-03 |
| 52 | -1.320341E+01 | -2.355572E-02 | 3.104234E-03 | -9.814082E-05 | 5.777320E-05 |
| No. | $a_{12}$ | $a_{14}$ | $a_{16}$ | $a_{18}$ | $a_{20}$ |
| 11 | 1.464556E-04 | -3.561159E-06 | -1.757632E-05 | -1.357529E-05 | 4.863916E-06 |
| 12 | -2.201804E-02 | 6.646288E-03 | -9.714854E-04 | 2.200666E-05 | 4.946878E-06 |
| 21 | -2.727600E-02 | 7.443303E-03 | -7.164887E-04 | 3.241395E-04 | -1.519084E-04 |
| 22 | -7.319292E-03 | 2.050672E-03 | -2.160980E-04 | 6.946344E-05 | -2.692328E-05 |
| 31 | 2.494530E-03 | -1.012901E-03 | 2.849325E-04 | -3.772911E-05 | 9.277671E-07 |
| 32 | 1.994942E-03 | -5.873248E-04 | 1.082395E-04 | -1.209205E-05 | 1.371033E-06 |
| 41 | 6.372211E-03 | -2.183729E-03 | 4.613089E-04 | -5.595200E-05 | 3.143113E-06 |
| 42 | 1.775176E-03 | -9.048096E-04 | 3.441469E-04 | -7.459344E-05 | 6.891802E-06 |
| 51 | -1.351811E-03 | -9.349528E-05 | 2.804173E-04 | -8.569982E-05 | 8.574634E-06 |
| 52 | -9.849713E-05 | 4.127090E-05 | -8.238912E-06 | 8.321608E-07 | -3.456197E-08 |

FIG. 31

| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
|---|---|---|---|---|---|---|---|---|---|
| | | | Sixth Embodiment | | | | | | |
| | | | EFL=13.829mm, EFLA=9.544mm, Fno of the first focusing state=3.093, Fno of the second focusing state=2.240, HFOV of the first focusing state=14.124degrees, HFOV of the second focusing state=13.481degrees, TTL=14.601mm, ImgH=3.500mm | | | | | | |
| | Object | Infinity | Infinity | | 48.697 | | | | |
| 2 | Ape. Stop | Infinity | -0.100 | | -0.100 | | | | |
| 11 | First lens element | 4.699 | 1.539 | T1 | 1.539 | T1 | 1.545 | 55.987 | 14.317 |
| 12 | | 10.412 | 0.072 | G12 | 0.072 | G12 | | | |
| 21 | Second lens element | 5.216 | 0.570 | T2 | 0.570 | T2 | 1.640 | 23.529 | -10.359 |
| 22 | | 2.803 | 0.680 | G23 | 0.680 | G23 | | | |
| 31 | Third lens element | 14.557 | 1.612 | T3 | 1.612 | T3 | 1.545 | 55.987 | 6.140 |
| 32 | | -4.188 | 1.095 | G34 | 3.458 | G34 | | | |
| 41 | Fourth lens element | -12.479 | 0.794 | T4 | 0.794 | T4 | 1.640 | 23.529 | 22.290 |
| 42 | | -6.845 | 0.467 | G45 | 0.467 | G45 | | | |
| 51 | Fifth lens element | -6.407 | 1.206 | T5 | 1.206 | T5 | 1.545 | 55.987 | -6.426 |
| 52 | | 8.281 | 5.208 | G5F | 2.845 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

FIG. 32

| No. | K | $a_4$ | $a_6$ | $a_8$ | $a_{10}$ |
|---|---|---|---|---|---|
| 11 | -2.485456E-01 | -2.139346E-03 | 1.075010E-03 | -1.065385E-03 | 5.660029E-04 |
| 12 | 9.558062E-01 | -1.041499E-03 | 2.586363E-02 | -4.587963E-02 | 3.891967E-02 |
| 21 | -2.433407E+00 | -1.673209E-02 | 3.028515E-02 | -5.807002E-02 | 5.235027E-02 |
| 22 | 3.497839E-01 | -2.085210E-02 | 7.400977E-03 | -2.284950E-02 | 2.366276E-02 |
| 31 | 1.547939E+00 | 1.730328E-03 | -1.234731E-03 | -9.006892E-04 | 3.980843E-04 |
| 32 | 7.953328E-01 | 7.769770E-04 | -4.024882E-04 | 2.987187E-04 | -2.598348E-04 |
| 41 | -2.021162E+01 | 2.129924E-02 | -9.632154E-04 | 8.528947E-04 | -5.403435E-04 |
| 42 | -2.441892E+01 | 8.924232E-03 | 7.462941E-03 | -3.325476E-03 | 8.100803E-04 |
| 51 | 2.359254E+00 | 3.797482E-03 | -1.084029E-02 | 7.489840E-03 | -4.256396E-03 |
| 52 | -1.756044E+01 | -2.103075E-03 | -6.163839E-03 | 4.704590E-03 | -2.454909E-03 |
| No. | $a_{12}$ | $a_{14}$ | $a_{16}$ | $a_{18}$ | $a_{20}$ |
| 11 | -1.867636E-04 | 3.638723E-05 | -3.912912E-06 | 1.936238E-07 | -2.194417E-09 |
| 12 | -1.864241E-02 | 5.296214E-03 | -8.857162E-04 | 8.080878E-05 | -3.117683E-06 |
| 21 | -2.599330E-02 | 7.606934E-03 | -1.310596E-03 | 1.233686E-04 | -4.914970E-06 |
| 22 | -1.255561E-02 | 3.846294E-03 | -6.883233E-04 | 6.692894E-05 | -2.743319E-06 |
| 31 | 1.849002E-04 | -1.706622E-04 | 4.930372E-05 | -6.390482E-06 | 3.070525E-07 |
| 32 | 1.355300E-04 | -4.204189E-05 | 7.588242E-06 | -7.418877E-07 | 2.982127E-08 |
| 41 | 1.435919E-04 | -7.110223E-06 | -3.821562E-06 | 6.807617E-07 | -3.013073E-08 |
| 42 | 4.722904E-06 | -1.075885E-04 | 4.563002E-05 | -8.551969E-06 | 6.172843E-07 |
| 51 | 1.679553E-03 | -4.502337E-04 | 7.698171E-05 | -7.557703E-06 | 3.115895E-07 |
| 52 | 8.779528E-04 | -2.105246E-04 | 3.225870E-05 | -2.850580E-06 | 1.103749E-07 |

FIG. 33

| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
|---|---|---|---|---|---|---|---|---|---|
| | | | | | | | | | |
| | Object | Infinity | Infinity | | 48.697 | | | | |
| 2 | Ape. Stop | Infinity | -0.177 | | -0.177 | | | | |
| 11 | First lens element | 4.614 | 2.157 | T1 | 2.157 | T1 | 1.545 | 55.987 | 13.329 |
| 12 | | 10.512 | 0.059 | G12 | 0.059 | G12 | | | |
| 21 | Second lens element | 5.245 | 0.386 | T2 | 0.386 | T2 | 1.640 | 23.529 | -10.194 |
| 22 | | 2.833 | 0.400 | G23 | 0.400 | G23 | | | |
| 31 | Third lens element | 12.221 | 0.629 | T3 | 0.629 | T3 | 1.545 | 55.987 | 5.976 |
| 32 | | -4.373 | 1.099 | G34 | 3.458 | G34 | | | |
| 41 | Fourth lens element | -5.545 | 0.937 | T4 | 0.937 | T4 | 1.640 | 23.529 | 18.029 |
| 42 | | -4.002 | 0.230 | G45 | 0.230 | G45 | | | |
| 51 | Fifth lens element | -6.531 | 0.940 | T5 | 0.940 | T5 | 1.545 | 55.987 | -7.011 |
| 52 | | 9.732 | 5.208 | G5F | 2.848 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

Seventh Embodiment

EFL=12.901mm, EFLA=9.436mm, Fno of the first focusing state=3.082,
Fno of the second focusing state=2.341, HFOV of the first focusing state=15.126degrees,
HFOV of the second focusing state=13.732degrees, TTL=13.404mm, ImgH=3.500mm

FIG. 34

| No. | K | $a_4$ | $a_6$ | $a_8$ | $a_{10}$ |
|---|---|---|---|---|---|
| 11 | -2.400030E-01 | -2.138259E-03 | 7.694677E-04 | -6.978035E-04 | 2.183867E-04 |
| 12 | 4.456927E+00 | -4.786879E-03 | 3.429514E-02 | -5.716563E-02 | 4.720771E-02 |
| 21 | -2.478307E+00 | -1.648378E-02 | 3.119954E-02 | -5.781869E-02 | 5.120634E-02 |
| 22 | 3.304297E-01 | -1.877201E-02 | -1.267005E-03 | -9.639784E-03 | 1.248859E-02 |
| 31 | -1.467234E+01 | 2.709059E-03 | -4.913398E-03 | 3.657203E-03 | -3.398158E-03 |
| 32 | 1.056470E+00 | 1.632946E-03 | -4.781619E-03 | 5.403146E-03 | -4.116302E-03 |
| 41 | -8.890964E+00 | 2.147517E-02 | -1.065767E-02 | 1.440366E-02 | -1.202803E-02 |
| 42 | -1.270049E+01 | 1.644949E-02 | -3.719277E-03 | 5.213767E-03 | -3.743535E-03 |
| 51 | 3.194594E+00 | -1.033708E-03 | -3.853217E-03 | -1.415306E-03 | 2.428257E-03 |
| 52 | -1.407057E+02 | -1.002402E-02 | -3.023109E-04 | -3.443728E-04 | 2.906844E-04 |
| No. | $a_{12}$ | $a_{14}$ | $a_{16}$ | $a_{18}$ | $a_{20}$ |
| 11 | -3.609998E-06 | -1.814887E-05 | 5.255253E-06 | -6.234550E-07 | 2.796062E-08 |
| 12 | -2.214531E-02 | 6.199075E-03 | -1.027272E-03 | 9.331130E-05 | -3.582357E-06 |
| 21 | -2.515282E-02 | 7.316714E-03 | -1.257920E-03 | 1.185478E-04 | -4.734128E-06 |
| 22 | -6.922848E-03 | 2.052011E-03 | -3.271486E-04 | 2.453842E-05 | -5.312511E-07 |
| 31 | 2.419125E-03 | -1.061305E-03 | 2.733564E-04 | -3.783292E-05 | 2.158473E-06 |
| 32 | 1.969979E-03 | -5.944272E-04 | 1.097163E-04 | -1.136735E-05 | 5.002744E-07 |
| 41 | 6.345462E-03 | -2.162617E-03 | 4.656593E-04 | -5.728813E-05 | 3.074644E-06 |
| 42 | 1.804938E-03 | -8.826123E-04 | 3.405098E-04 | -7.410611E-05 | 6.566635E-06 |
| 51 | -1.234295E-03 | -1.023696E-04 | 2.691280E-04 | -8.470830E-05 | 8.698516E-06 |
| 52 | -1.263244E-04 | 3.902375E-05 | -8.392932E-06 | 1.067668E-06 | -5.779571E-08 |

FIG. 35

| No. | | Radius of Curvature (mm) | First focusing state Ape. Stop Distance Thickness Air Gap (mm) | | Second focusing state Ape. Stop Distance Thickness Air Gap (mm) | | Refractive Index | Abbe No. | Focal Length (mm) |
|---|---|---|---|---|---|---|---|---|---|
| | | | | Eighth Embodiment | | | | | |
| | | EFL=10.190mm, EFLA=9.482mm, Fno of the first focusing state=3.080, Fno of the second focusing state=2.866, HFOV of the first focusing state=18.086degrees, HFOV of the second focusing state=15.098degrees, TTL=13.171mm, ImgH=3.500mm | | | | | | | |
| | Object | Infinity | Infinity | | 48.697 | | | | |
| 2 | Ape. Stop | Infinity | -0.440 | | -0.440 | | | | |
| 11 | First lens element | 3.491 | 0.750 | T1 | 0.750 | T1 | 1.545 | 55.987 | 9.665 |
| 12 | | 9.520 | 0.130 | G12 | 0.130 | G12 | | | |
| 21 | Second lens element | 8.021 | 0.423 | T2 | 0.423 | T2 | 1.640 | 23.529 | -12.653 |
| 22 | | 3.961 | 3.094 | G23 | 0.350 | G23 | | | |
| 31 | Third lens element | 3.889 | 1.433 | T3 | 1.433 | T3 | 1.545 | 55.987 | 6.070 |
| 32 | | -19.557 | 1.153 | G34 | 1.153 | G34 | | | |
| 41 | Fourth lens element | -2.276 | 1.589 | T4 | 1.589 | T4 | 1.640 | 23.529 | -39.303 |
| 42 | | -3.185 | 0.122 | G45 | 0.122 | G45 | | | |
| 51 | Fifth lens element | -574.915 | 1.780 | T5 | 1.780 | T5 | 1.545 | 55.987 | -13.801 |
| 52 | | 7.648 | 1.339 | G5F | 4.083 | G5F | | | |
| 3 | Filter | Infinity | 0.210 | | 0.210 | | 1.517 | 64.167 | |
| | | Infinity | 1.149 | | 1.149 | | | | |
| 4 | Image plane | Infinity | | | | | | | |

FIG. 36

| No. | K | $a_4$ | $a_6$ | $a_8$ | $a_{10}$ |
|---|---|---|---|---|---|
| 11 | 1.066366E+00 | 1.573042E-03 | 1.581220E-03 | -7.865715E-04 | 1.807281E-04 |
| 12 | 3.258405E+01 | 8.798737E-03 | 2.582754E-02 | -4.106049E-02 | 3.019711E-02 |
| 21 | 2.239764E+01 | -1.976817E-03 | 2.330404E-02 | -4.225022E-02 | 3.268025E-02 |
| 22 | 2.398953E+00 | -7.011124E-03 | 3.546213E-03 | -9.061455E-03 | 7.909608E-03 |
| 31 | 1.890980E+00 | -5.570885E-03 | 1.166375E-03 | -2.855067E-03 | 2.436413E-03 |
| 32 | -3.339416E+00 | 3.651720E-04 | -4.025030E-03 | 3.892924E-03 | -2.607646E-03 |
| 41 | -5.559973E-02 | 3.840207E-02 | -7.697624E-03 | 7.633750E-03 | -4.908803E-03 |
| 42 | -2.120199E-01 | 1.502185E-02 | -7.746722E-04 | 2.641818E-03 | -1.262350E-03 |
| 51 | 2.728875E-03 | -2.383338E-02 | 3.567600E-03 | -1.764917E-03 | 1.352104E-03 |
| 52 | -3.300345E+01 | -1.232855E-02 | 1.177997E-03 | 3.483212E-05 | 1.759870E-05 |
| No. | $a_{12}$ | $a_{14}$ | $a_{16}$ | $a_{18}$ | $a_{20}$ |
| 11 | 3.050566E-05 | -7.123634E-06 | -2.289872E-07 | -1.042214E-06 | 3.469932E-07 |
| 12 | -1.298487E-02 | 3.304477E-03 | -4.829167E-04 | 4.241984E-05 | -3.564809E-06 |
| 21 | -1.473127E-02 | 3.902404E-03 | -5.934070E-04 | 5.314681E-05 | -4.188368E-06 |
| 22 | -3.918140E-03 | 1.144046E-03 | -1.837938E-04 | 1.095006E-05 | 6.122011E-07 |
| 31 | -1.408743E-03 | 5.214718E-04 | -1.203426E-04 | 1.555321E-05 | -8.662512E-07 |
| 32 | 1.133928E-03 | -3.191302E-04 | 5.461821E-05 | -5.179645E-06 | 2.086138E-07 |
| 41 | 2.160011E-03 | -6.141557E-04 | 1.084881E-04 | -1.087631E-05 | 4.875187E-07 |
| 42 | 3.684698E-04 | -1.171075E-04 | 3.746721E-05 | -7.160479E-06 | 5.433801E-07 |
| 51 | -4.385085E-04 | -5.140526E-05 | 6.463004E-05 | -1.467555E-05 | 1.092938E-06 |
| 52 | -3.561851E-05 | 1.205338E-05 | -1.902646E-06 | 1.474153E-07 | -4.506003E-09 |

FIG. 37

First focusing state

| Relationships | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|
| (TTL*ΔHFOV)/ΔG | 3.255 | 2.335 | 2.095 | 0.813 | 5.641 | 3.974 | 7.918 | 14.341 |
| (V1+V3)/V2 | 4.759 | 3.412 | 4.759 | 4.759 | 4.759 | 4.759 | 4.759 | 4.759 |
| TTL/(G34+BFL) | 1.876 | 1.874 | 2.122 | 2.500 | 2.363 | 1.906 | 1.749 | 3.420 |
| TL/(T1+T3) | 2.508 | 2.409 | 2.128 | 2.512 | 3.103 | 2.550 | 2.453 | 4.798 |
| ALT/(G23+G45) | 4.700 | 6.688 | 9.375 | 9.680 | 4.700 | 4.988 | 8.022 | 1.857 |
| (T1+G12)/T5 | 2.700 | 1.305 | 1.539 | 0.432 | 1.140 | 1.336 | 2.358 | 0.494 |
| ImgH/(T4+G45+T5) | 1.562 | 1.429 | 1.556 | 1.100 | 1.420 | 1.419 | 1.661 | 1.003 |
| (V3+V5)/V4 | 4.759 | 3.412 | 4.759 | 4.759 | 4.759 | 4.759 | 4.759 | 4.759 |
| TTL/EFL | 1.033 | 1.080 | 0.964 | 1.252 | 1.345 | 1.056 | 1.039 | 1.293 |
| TL/AAG | 2.923 | 3.856 | 7.958 | 6.109 | 3.930 | 3.473 | 3.825 | 2.328 |
| ALT/(T1+G12+T2) | 1.800 | 3.080 | 2.764 | 5.266 | 2.582 | 2.623 | 1.940 | 4.588 |
| T3/(G23+G45) | 1.000 | 2.224 | 2.554 | 3.673 | 1.000 | 1.405 | 1.000 | 0.446 |
| ImgH/(T2+G23) | 4.045 | 3.680 | 4.040 | 3.634 | 2.800 | 2.800 | 4.455 | 0.995 |
| V2+V3+V4 | 103.045 | 111.145 | 103.045 | 103.045 | 103.045 | 103.045 | 103.045 | 103.045 |
| TTL/ALT | 2.800 | 2.486 | 2.110 | 1.851 | 2.270 | 2.552 | 2.654 | 2.205 |
| BFL/(T3+G34) | 3.006 | 2.172 | 3.217 | 1.412 | 3.800 | 2.426 | 3.800 | 1.043 |
| AAG/ΔG | 1.083 | 0.859 | 0.277 | 1.622 | 4.000 | 0.979 | 0.758 | 1.640 |
| (T2+T4+G45)/T5 | 1.800 | 1.799 | 1.800 | 1.351 | 1.122 | 1.519 | 1.651 | 1.199 |
| EFL/EFLA | 1.441 | 1.410 | 1.480 | 1.277 | 1.176 | 1.449 | 1.367 | 1.075 |
| ALT/Tmin | 14.713 | 11.564 | 11.404 | 11.664 | 14.109 | 10.031 | 13.083 | 14.129 |
| Tmax/Tavg | 1.967 | 1.663 | 1.362 | 1.897 | 1.387 | 1.408 | 2.136 | 1.490 |
| TTL/(Tmax+Tmin) | 6.069 | 5.934 | 5.859 | 3.980 | 6.517 | 6.692 | 5.270 | 5.980 |
| |f1/f2| | 1.398 | 1.460 | 0.460 | 0.033 | 0.572 | 1.382 | 1.308 | 0.764 |
| f4/f5 | -3.396 | 8.872 | -2.641 | 6.889 | -11.547 | -3.469 | -2.572 | 2.848 |
| f4/f3 | 3.898 | -16.709 | -0.015 | -11.797 | 16.035 | 3.630 | 3.017 | -6.475 |
| f3/f5 | -0.871 | -0.531 | 173.853 | -0.584 | -0.720 | -0.955 | -0.852 | -0.440 |

FIG. 38

| Relationships | Second focusing state | | | | | | | |
| --- | --- | --- | --- | --- | --- | --- | --- | --- |
| | First Embodiment | Second Embodiment | Third Embodiment | Fourth Embodiment | Fifth Embodiment | Sixth Embodiment | Seventh Embodiment | Eighth Embodiment |
| (TTL*ΔHFOV)/ΔG | 3.255 | 2.335 | 2.095 | 0.813 | 5.641 | 3.974 | 7.918 | 14.341 |
| (V1+V3)/V2 | 4.759 | 3.412 | 4.759 | 4.759 | 4.759 | 4.759 | 4.759 | 4.759 |
| TTL/(G34+BFL) | 1.876 | 1.874 | 2.122 | 2.500 | 2.363 | 1.906 | 1.749 | 1.997 |
| TL/(T1+T3) | 3.300 | 3.136 | 3.093 | 2.765 | 3.300 | 3.300 | 3.300 | 3.541 |
| ALT/(G23+G45) | 4.700 | 6.688 | 9.375 | 9.680 | 4.700 | 4.988 | 8.022 | 12.656 |
| (T1+G12)/T5 | 2.700 | 1.305 | 1.539 | 0.432 | 1.140 | 1.336 | 2.358 | 0.494 |
| ImgH/(T4+G45+T5) | 1.562 | 1.429 | 1.556 | 1.100 | 1.420 | 1.419 | 1.661 | 1.003 |
| (V3+V5)/V4 | 4.759 | 3.412 | 4.759 | 4.759 | 4.759 | 4.759 | 4.759 | 4.759 |
| TL/AAG | 2.000 | 2.319 | 2.509 | 4.161 | 3.344 | 2.223 | 2.218 | 4.404 |
| ALT/(T1+G12+T2) | 1.800 | 3.080 | 2.764 | 5.266 | 2.582 | 2.623 | 1.940 | 4.588 |
| T3/(G23+G45) | 1.000 | 2.224 | 2.554 | 3.673 | 1.000 | 1.405 | 1.000 | 3.036 |
| ImgH/(T2+G23) | 4.045 | 3.680 | 4.040 | 3.634 | 2.800 | 2.800 | 4.455 | 4.528 |
| V2+V3+V4 | 103.045 | 111.145 | 103.045 | 103.045 | 103.045 | 103.045 | 103.045 | 103.045 |
| TTL/ALT | 2.800 | 2.486 | 2.110 | 1.851 | 2.270 | 2.552 | 2.654 | 2.205 |
| BFL/(T3+G34) | 0.883 | 0.782 | 0.546 | 0.915 | 2.558 | 0.829 | 1.029 | 2.104 |
| AAG/ΔG | 1.083 | 0.859 | 0.277 | 1.622 | 4.000 | 0.979 | 0.758 | 1.640 |
| (T2+T4+G45)/T5 | 1.800 | 1.799 | 1.800 | 1.351 | 1.122 | 1.519 | 1.651 | 1.199 |
| EFL/EFLA | 1.441 | 1.410 | 1.480 | 1.277 | 1.176 | 1.449 | 1.367 | 1.075 |
| ALT/Tmin | 14.713 | 11.564 | 11.404 | 11.664 | 14.109 | 10.031 | 13.083 | 14.129 |
| Tmax/Tavg | 1.967 | 1.663 | 1.362 | 1.897 | 1.387 | 1.408 | 2.136 | 1.490 |
| TTL/(Tmax+Tmin) | 6.069 | 5.934 | 5.859 | 3.980 | 6.517 | 6.692 | 5.270 | 5.980 |
| |f1/f2| | 1.398 | 1.460 | 0.460 | 0.033 | 0.572 | 1.382 | 1.308 | 0.764 |
| f4/f5 | -3.396 | 8.872 | -2.641 | 6.889 | -11.547 | -3.469 | -2.572 | 2.848 |
| f4/f3 | 3.898 | -16.709 | -0.015 | -11.797 | 16.035 | 3.630 | 3.017 | -6.475 |
| f3/f5 | -0.871 | -0.531 | 173.853 | -0.584 | -0.720 | -0.955 | -0.852 | -0.440 |

FIG. 39

OPTICAL IMAGING LENS INCLUDING FIVE LENSES OF +−++−, +−+−−, +−−+− AND −++−− REFRACTIVE POWERS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or can be applied to intelligent electronic products such as vehicle devices, head mounted displays (AR, VR, MR) for taking pictures or for recording videos.

2. Description of the Prior Art

In recent years, optical imaging lens has been continuously evolving and are required to be used in a wider range of applications. In addition to requiring a small lens size, the demand for video recording of electronic products is also increasing.

However, when the shooting system consists of multiple lenses with different functions and is supplemented by software processing, the arrangement of multiple lenses takes up more space. Therefore, how to design an optical imaging lens that is light, thin and short, having an infinite object distance, and can also focus at a macro distance by using a single optical imaging lens to meet different shooting requirements has become an extremely urgent problem to be solved at present.

SUMMARY OF THE INVENTION

Thus, each embodiment of the present invention proposes an optical imaging lens with small volume, focusing function, excellent imaging quality, good optical performance and technically feasible. The optical imaging lens of the present invention has a first lens element, a second lens element, a third lens element, a fourth lens element and a fifth lens element from an object side to an image side along an optical axis. The first lens element, the second lens element, the third lens element, the fourth lens element and the fifth lens element each comprise an object-side surface facing toward the object side and allowing imaging rays to pass through as well as an image-side surface facing toward the image side and allowing the imaging rays to pass through, when an object moves from infinity to macro, the optical imaging lens correspondingly forms a first focusing state and a second focusing state to achieve the purpose of focusing.

In one embodiment of the present invention, the fifth lens element has negative refracting power, an optical axis region of the object-side surface of the fifth lens element is concave, and an optical axis region of the image-side surface of the fifth lens element is concave. Lens elements included by the optical imaging lens are only the five lens elements described above, and the optical imaging lens satisfies the relationship: (TTL*ΔHFOV)/ΔG≤19.000 degrees. TTL is the distance from the object-side surface of the first lens element to an image plane along the optical axis, ΔHFOV is defined as the absolute value of the difference of the half field of view of the optical imaging lens in the first focusing state and the second focusing state, ΔG is defined as the absolute value of the difference of the sum of air gaps of the optical imaging lens in the first focusing state and the second focusing state.

In one embodiment of the present invention, an optical axis region of the image-side surface of the third lens element is convex, the fifth lens element has negative refracting power, and an optical axis region of the object-side surface of the fifth lens element is concave. lens elements included by the optical imaging lens are only the five lens elements described above, and the optical imaging lens satisfies the relationship: (TTL*ΔHFOV)/ΔG≤19.000 degrees. TTL is the distance from the object-side surface of the first lens element to an image plane along the optical axis, ΔHFOV is defined as the absolute value of the difference of the half field of view of the optical imaging lens in the first focusing state and the second focusing state, ΔG is defined as the absolute value of the difference of the sum of air gaps of the optical imaging lens in the first focusing state and the second focusing state.

In one embodiment of the present invention, an optical axis region of the image-side surface of the third lens element is convex, the fifth lens element has negative refracting power. Lens elements included by the optical imaging lens are only the five lens elements described above, and wherein the optical imaging lens satisfies the relationship: (TTL*ΔHFOV)/ΔG≤15.000 degrees. TTL is the distance from the object-side surface of the first lens element to an image plane along the optical axis, ΔHFOV is defined as the absolute value of the difference of the half field of view of the optical imaging lens in the first focusing state and the second focusing state, ΔG is defined as the absolute value of the difference of the sum of air gaps of the optical imaging lens in the first focusing state and the second focusing state.

In one embodiment of the present invention, an optical axis region of the image-side surface of the third lens element is convex, an optical axis region of the image-side surface of the fourth lens element is convex, and an optical axis region of the object-side surface of the fifth lens element is concave. Lens elements included by the optical imaging lens are only the five lens elements described above, and wherein the optical imaging lens satisfies the relationship: (TTL*ΔHFOV)/ΔG≤19.000 degrees. TTL is the distance from the object-side surface of the first lens element to an image plane along the optical axis, ΔHFOV is defined as the absolute value of the difference of the half field of view of the optical imaging lens in the first focusing state and the second focusing state, ΔG is defined as the absolute value of the difference of the sum of air gaps of the optical imaging lens in the first focusing state and the second focusing state.

In one embodiment of the present invention, an optical axis region of the image-side surface of the third lens element is convex, a periphery region of the object-side surface of the fourth lens element is convex, and the fifth lens element has negative refracting power. Lens elements included by the optical imaging lens are only the five lens elements described above, and wherein the optical imaging lens satisfies the relationship: (TTL*ΔHFOV)/ΔG≤19.000 degrees. TTL is the distance from the object-side surface of the first lens element to an image plane along the optical axis, ΔHFOV is defined as the absolute value of the difference of the half field of view of the optical imaging lens in the first focusing state and the second focusing state, ΔG is defined as the absolute value of the difference of the sum of air gaps of the optical imaging lens in the first focusing state and the second focusing state.

In the optical imaging lens of the present invention, the embodiments may also selectively satisfy the following optical conditions:

$$(V1+V3)/V2 \geq 3.400;$$

$$TTL/(G34+BFL) \leq 3.500;$$

$$TL/(T1+T3) \leq 3.300;$$

$$ALT/(G23+G45) \geq 4.700;$$

$$(T1+G12)/T5 \leq 2.700;$$

$$ImgH/(T4+G45+T5) \geq 0.900;$$

$$(V3+V5)/V4 \geq 3.400;$$

$$TTL/EFL \leq 2.000;$$

$$TL/AAG \geq 2.000;$$

$$ALT/(T1+G12+T2) \geq 1.800;$$

$$T3/(G23+G45) \geq 1.000;$$

$$ImgH/(T2+G23) \geq 2.800;$$

$$V2+V3+V4 \leq 130.000;$$

$$TTL/ALT \leq 2.800;$$

$$BFL/(T3+G34) \leq 3.800;$$

$$AAG/\Delta G \leq 5.000;$$

$$(T2+T4+G45)/T5 \leq 1.800;$$

$$EFL/EFLA \leq 1.500;$$

$$|f1/f2| \leq 1.500;$$

$$f4/f5 \leq -1.500;$$

$$f4/f3 \leq 17.000;$$

$$f3/f5 \leq 0.000;$$

$$ALT/Tmin \geq 10.000;$$

$$Tmax/Tavg \leq 2.200; \text{ and}$$

$$TTL/(Tmax+Tmin) \leq 7.000.$$

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis. G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis. AAG is a sum of four air gaps from the first lens element to the fifth lens element along the optical axis.

Furthermore, f1 is defined as the focal length of the first lens element; f2 is defined as the focal length of the second lens element; f3 is defined as the focal length of the third lens element; f4 is defined as the focal length of the fourth lens element; f5 is defined as the focal length of the fifth lens element. V1 is defined as the Abbe number of the first lens element; V2 is defined as the Abbe number of the second lens element; V3 is defined as the Abbe number of the third lens element; V4 is defined as the Abbe number of the fourth lens element; V5 is defined as the Abbe number of the fifth lens element. ALT is a sum of the thicknesses of five lens elements from the first lens element to the fifth lens element along the optical axis; TL is a distance from the object-side surface of the first lens element to the image-side surface of the fifth lens element along the optical axis; TTL is a distance from the object-side surface of the first lens element to an image plane along the optical axis; BFL is a distance from the image-side surface of the fifth lens element to the image plane along the optical axis; EFL is an effective focal length of the optical imaging lens in the first focusing state and EFLA is an effective focal length of the optical imaging lens in the second focusing state; ImgH is an image height of the optical imaging lens; Tmax is the maximum value of the five thicknesses from the first lens element to the fifth lens element along the optical axis; Tmin is the minimum value of the five thicknesses from the first lens element to the fifth lens element along the optical axis; Tavg is the average value of the five thicknesses from the first lens element to the fifth lens element along the optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7A illustrates the longitudinal spherical aberration on the image plane in the first focusing state of the first embodiment.

FIG. 7B illustrates the field curvature aberration on the sagittal direction in the first focusing state of the first embodiment.

FIG. 7C illustrates the field curvature aberration on the tangential direction in the first focusing state of the first embodiment.

FIG. 7D illustrates the distortion in the first focusing state of the first embodiment.

FIG. 7E illustrates the longitudinal spherical aberration on the image plane in the second focusing state of the first embodiment.

FIG. 7F illustrates the field curvature aberration on the sagittal direction in the second focusing state of the first embodiment.

FIG. 7G illustrates the field curvature aberration on the tangential direction in the second focusing state of the first embodiment.

FIG. 7H illustrates the distortion in the second focusing state of the first embodiment.

FIG. 9A illustrates the longitudinal spherical aberration on the image plane in the first focusing state of the second embodiment.

FIG. 9B illustrates the field curvature aberration on the sagittal direction in the first focusing state of the second embodiment.

FIG. 9C illustrates the field curvature aberration on the tangential direction in the first focusing state of the second embodiment.

FIG. 9D illustrates the distortion in the first focusing state of the second embodiment.

FIG. 9E illustrates the longitudinal spherical aberration on the image plane in the second focusing state of the second embodiment.

FIG. 9F illustrates the field curvature aberration on the sagittal direction in the second focusing state of the second embodiment.

FIG. 9G illustrates the field curvature aberration on the tangential direction in the second focusing state of the second embodiment.

FIG. 9H illustrates the distortion in the second focusing state of the second embodiment.

FIG. 13A illustrates the longitudinal spherical aberration on the image plane in the first focusing state of the fourth embodiment.

FIG. 13B illustrates the field curvature aberration on the sagittal direction in the first focusing state of the fourth embodiment.

FIG. 13C illustrates the field curvature aberration on the tangential direction in the first focusing state of the fourth embodiment.

FIG. 13D illustrates the distortion in the first focusing state of the fourth embodiment.

FIG. 13E illustrates the longitudinal spherical aberration on the image plane in the second focusing state of the fourth embodiment.

FIG. 13F illustrates the field curvature aberration on the sagittal direction in the second focusing state of the fourth embodiment.

FIG. 13G illustrates the field curvature aberration on the tangential direction in the second focusing state of the fourth embodiment.

FIG. 13H illustrates the distortion in the second focusing state of the fourth embodiment.

FIG. 15A illustrates the longitudinal spherical aberration on the image plane in the first focusing state of the fifth embodiment.

FIG. 15B illustrates the field curvature aberration on the sagittal direction in the first focusing state of the fifth embodiment.

FIG. 15C illustrates the field curvature aberration on the tangential direction in the first focusing state of the fifth embodiment.

FIG. 15D illustrates the distortion in the first focusing state of the fifth embodiment.

FIG. 15E illustrates the longitudinal spherical aberration on the image plane in the second focusing state of the fifth embodiment.

FIG. 15F illustrates the field curvature aberration on the sagittal direction in the second focusing state of the fifth embodiment.

FIG. 15G illustrates the field curvature aberration on the tangential direction in the second focusing state of the fifth embodiment.

FIG. 15H illustrates the distortion in the second focusing state of the fifth embodiment.

FIG. 17A illustrates the longitudinal spherical aberration on the image plane in the first focusing state of the sixth embodiment.

FIG. 17B illustrates the field curvature aberration on the sagittal direction in the first focusing state of the sixth embodiment.

FIG. 17C illustrates the field curvature aberration on the tangential direction in the first focusing state of the sixth embodiment.

FIG. 17D illustrates the distortion in the first focusing state of the sixth embodiment.

FIG. 17E illustrates the longitudinal spherical aberration on the image plane in the second focusing state of the sixth embodiment.

FIG. 17F illustrates the field curvature aberration on the sagittal direction in the second focusing state of the sixth embodiment.

FIG. 17G illustrates the field curvature aberration on the tangential direction in the second focusing state of the sixth embodiment.

FIG. 17H illustrates the distortion in the second focusing state of the sixth embodiment.

FIG. 19A illustrates the longitudinal spherical aberration on the image plane in the first focusing state of the seventh embodiment.

FIG. 19B illustrates the field curvature aberration on the sagittal direction in the first focusing state of the seventh embodiment.

FIG. 19C illustrates the field curvature aberration on the tangential direction in the first focusing state of the seventh embodiment.

FIG. 19D illustrates the distortion in the first focusing state of the seventh embodiment.

FIG. 19E illustrates the longitudinal spherical aberration on the image plane in the second focusing state of the seventh embodiment.

FIG. 19F illustrates the field curvature aberration on the sagittal direction in the second focusing state of the seventh embodiment.

FIG. 19G illustrates the field curvature aberration on the tangential direction in the second focusing state of the seventh embodiment.

FIG. 19H illustrates the distortion in the second focusing state of the seventh embodiment.

FIG. 22 shows the optical data of the first embodiment of the optical imaging lens.

FIG. 23 shows the aspheric surface data of the first embodiment.

FIG. 24 shows the optical data of the second embodiment of the optical imaging lens.

FIG. 25 shows the aspheric surface data of the second embodiment.

FIG. 26 shows the optical data of the third embodiment of the optical imaging lens.

FIG. 27 shows the aspheric surface data of the third embodiment.

FIG. 28 shows the optical data of the fourth embodiment of the optical imaging lens.

FIG. 29 shows the aspheric surface data of the fourth embodiment.

FIG. 30 shows the optical data of the fifth embodiment of the optical imaging lens.

FIG. 31 shows the aspheric surface data of the fifth embodiment.

FIG. 32 shows the optical data of the sixth embodiment of the optical imaging lens.

FIG. 33 shows the aspheric surface data of the sixth embodiment.

FIG. 34 shows the optical data of the seventh embodiment of the optical imaging lens.

FIG. 35 shows the aspheric surface data of the seventh embodiment.

FIG. 36 shows the optical data of the eighth embodiment of the optical imaging lens.

FIG. 37 shows the aspheric surface data of the eighth embodiment.

FIG. 38 illustrates some important ratios in the first focusing state of each embodiment.

FIG. 39 illustrates some important ratios in the second focusing state of each embodiment.

DETAILED DESCRIPTION

The terms "optical axis region", "periphery region", "concave", and "convex" used in this specification and claims should be interpreted based on the definition listed in the specification by the principle of lexicographer.

Figure 1:
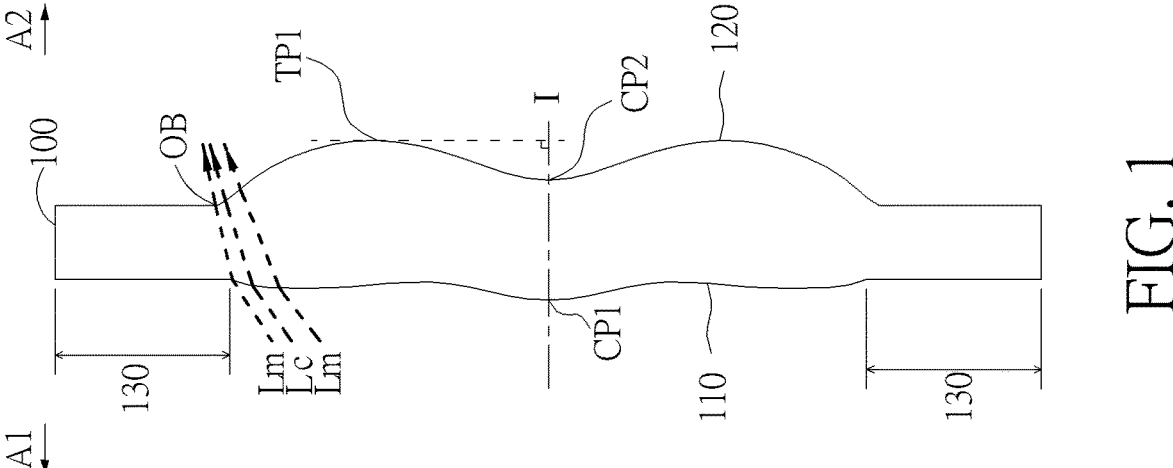

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
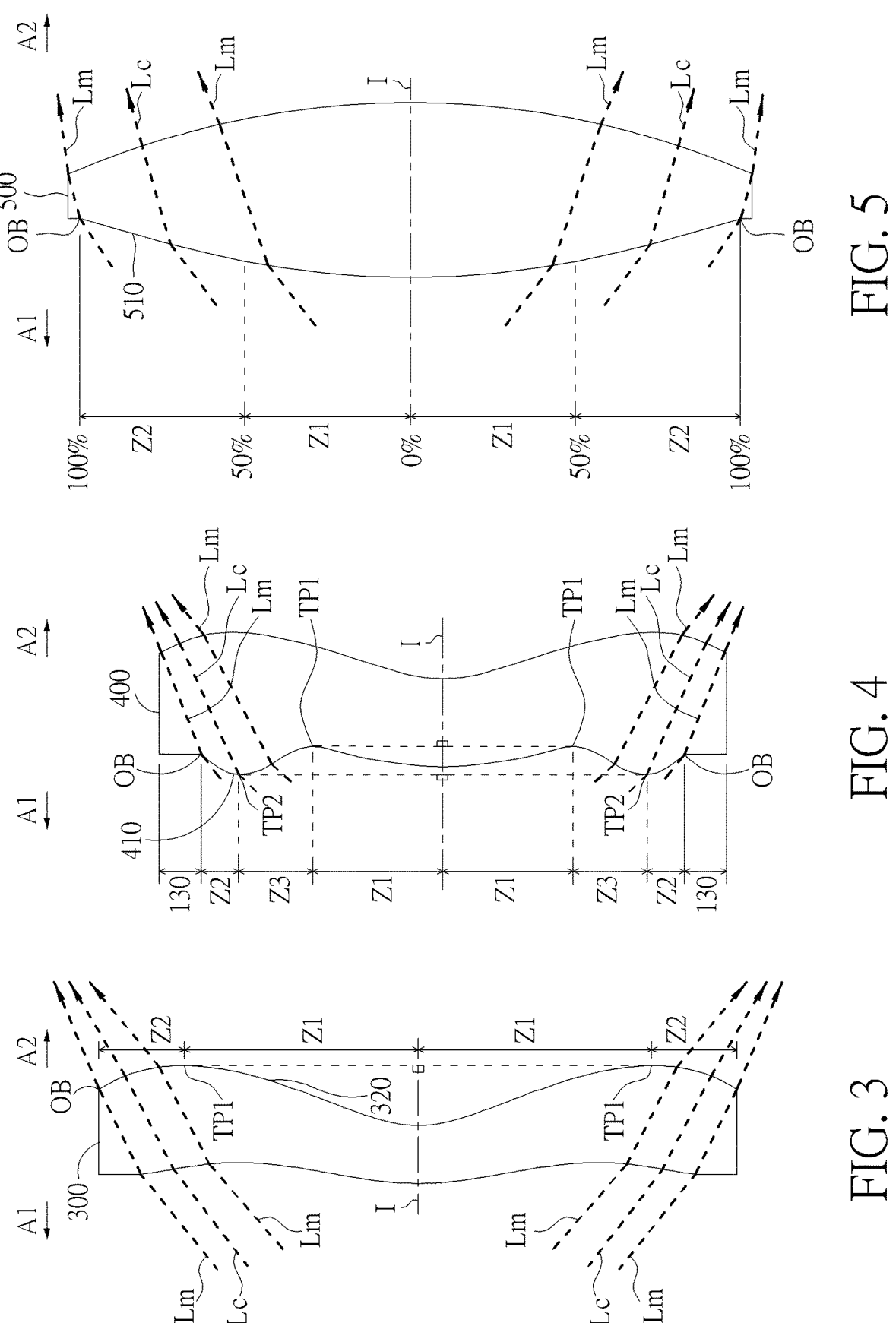

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
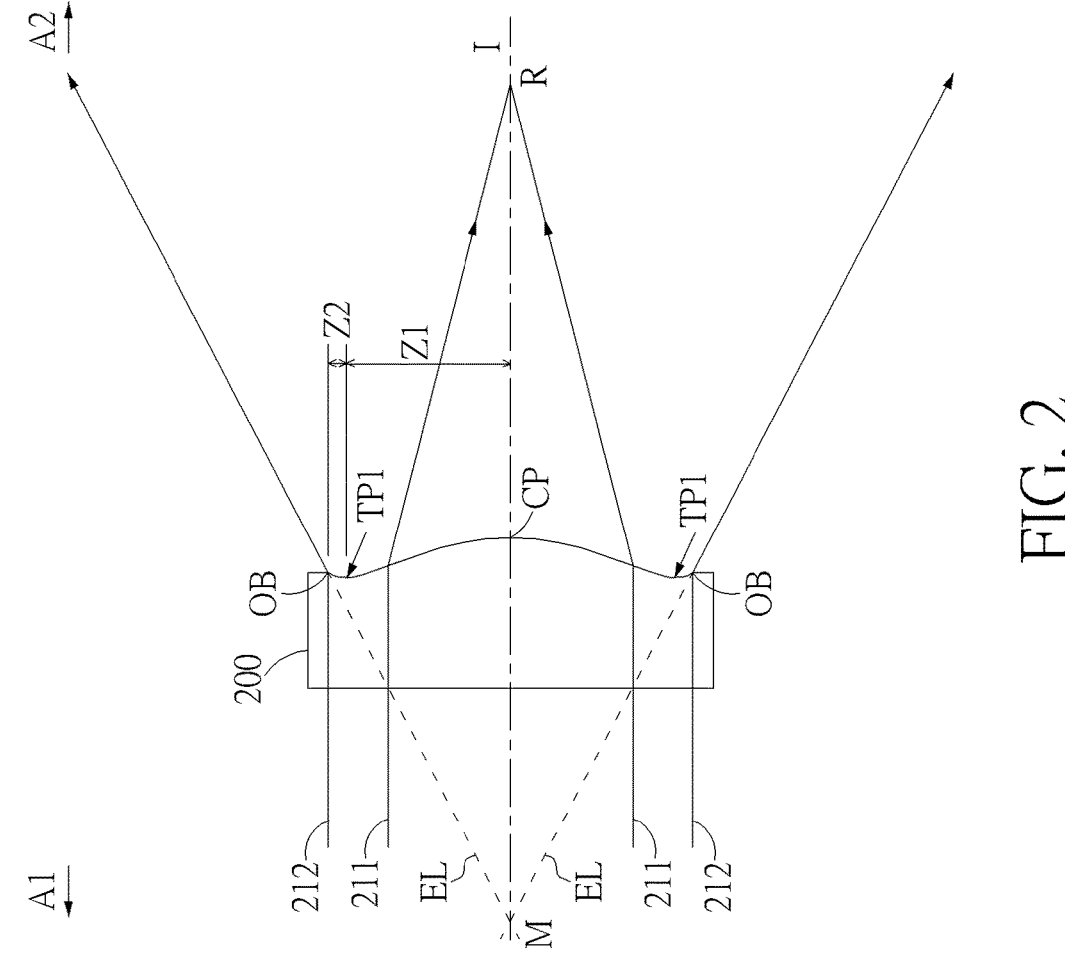
FIGS. 1-5 illustrate the methods for determining the surface shapes and for determining optical axis region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
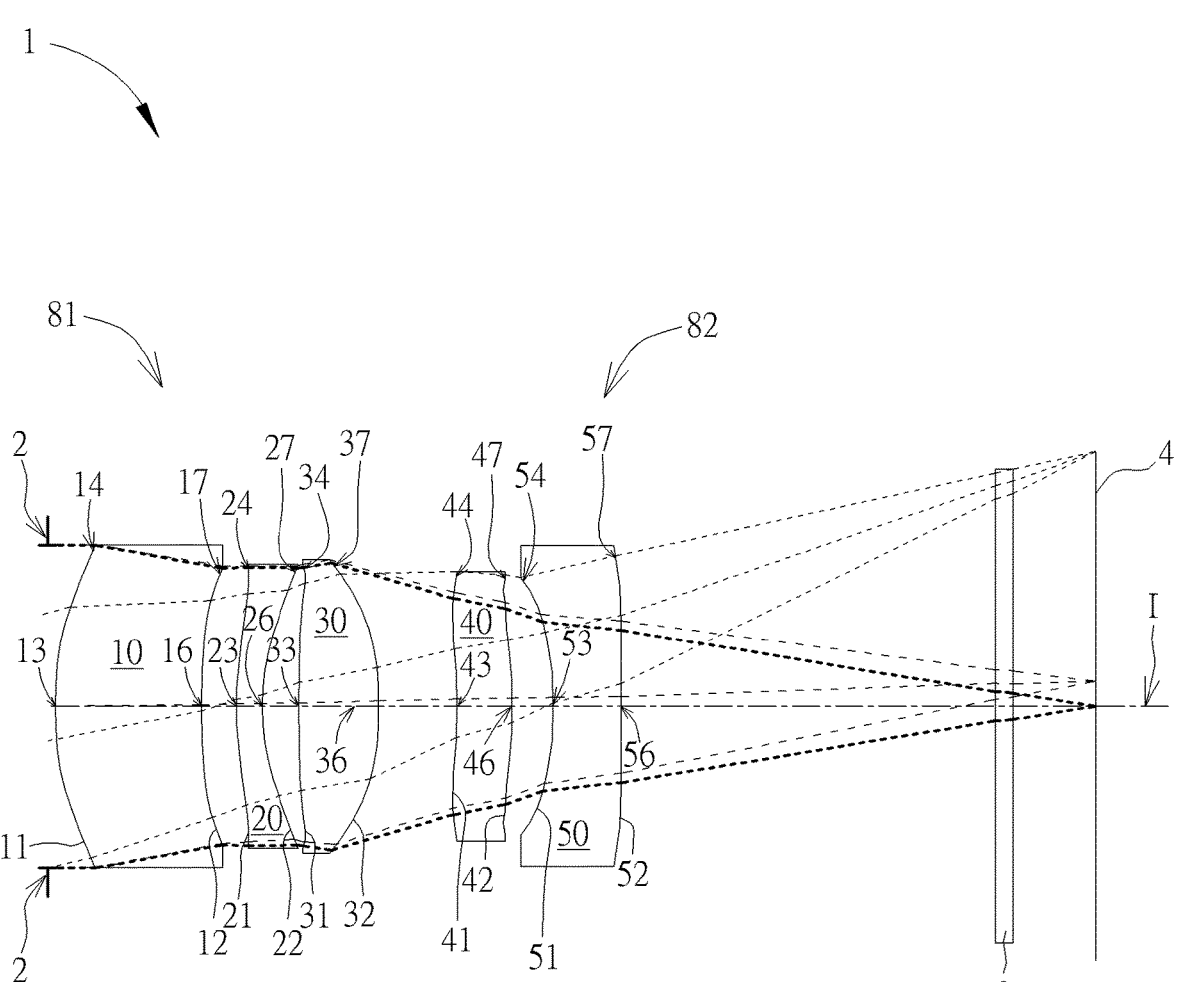
FIG. 6 illustrates a first embodiment of the optical imaging lens of the present invention.

As shown in FIG. 6, the optical imaging lens 1 of the present invention is mainly composed of five lens elements along an optical axis I from an object side A1 on which an object (not shown) is placed to an image side A2 on which an image is imaged, and sequentially includes an aperture stop (ape. stop) 2, a front lens group 81, a rear lens group 82, and an image plane 4.

In one embodiment of the present invention, the front lens group 81 may include at least two lens elements. The first lens element counted from the object side A1 in the front lens group 81 is the first lens element 10, the second lens element counted from the object side A1 in the front lens group 81 is the second lens element 20, and the third lens element counted from the object side A1 in the front lens group 81 is the third lens element 30. For example, in one embodiment of the present invention, the front lens group 81 may include the first lens element 10 and the second lens element 20. Or in another embodiment of the present invention, the front lens group 81 may include the first lens element 10, the second lens element 20 and the third lens element 30, but the present invention is not limited thereto. In another embodiment of the present invention, the rear lens group 82 may include at least two lens elements. For example, the first lens element counted from the image side A2 in the rear lens group 82 is the fifth lens element 50, and the second lens element counted from the image side A2 in the rear lens group 82 is the fourth lens element 40, but the present invention is not limited thereto.

The rear lens group 82 can move along the optical axis I to cause the optical imaging lens 1 to form different focusing states, such as forming different first focusing states or second focusing states. The first focusing state and the second focusing state may be one or the other of an object distance being infinite and an object distance being finite, respectively. In one embodiment of the present invention, the first focusing state may be an object distance being infinite. Or in another embodiment of the present invention, the second focusing state may be an object distance being finite, such as a macro state, but the present invention is not limited thereto Generally speaking, the first lens element 10, the second lens element 20, the third lens element 30, the fourth lens element 40 and the fifth lens element 50 may be made of a transparent plastic material but the present invention is not limited to this, and each lens element has an appropriate refracting power. In the present invention, lens elements included by the optical imaging lens 1 are only the five lens elements (the first lens element 10, the second lens element 20, the third lens element 30, the fourth lens element 40, and the fifth lens element 50) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 2 disposed in an appropriate position. In FIG. 6, the aperture stop 2 is disposed on the side of the first lens element 10 facing the object side A1. In other words, the first lens element 10 is disposed between the aperture stop 2 and the second lens element 20. When light emitted or reflected by an object (not shown) which is located at the object side A1 enters the optical imaging lens 1 of the present invention, it forms a clear and sharp image on the image plane 4 at the image side A2 after passing through the aperture stop 2, the first lens element 10, the second lens element 20, the third lens element 30, the fourth lens element 40, the fifth lens element 50 and the filter 3. In one embodiment of the present invention, the filter 3 is placed between the fifth lens element 50 and the image plane 4. The optional filter 3 may be a filter of various suitable functions, for example, the filter 3 may be an infrared cut-off filter (IR cut filter), which is used to prevent infrared rays in the imaging ray from being transmitted to the image plane 4 to affect the imaging quality.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52. In addition, each object-side surface and image-side surface in the optical imaging lens 1 of the present invention has an optical axis region and a periphery region.

Each lens element in the optical imaging lens 1 of the present invention further has a central thickness on the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5. Therefore, ALT is a sum of the thicknesses of the first lens element 10, the second lens element 20, the third lens element 30, the fourth lens element 40 and the fifth lens element 50 along the optical axis I of the optical imaging lens 1, that is, $ALT=T1+T2+T3+T4+T5$. Tmax is the maximum value of the five thicknesses from the first lens element 10 to the fifth lens element 50 along the optical axis I, that is, the maximum value of T1, T2, T3, T4 and T5. Tmin is the minimum value of the five thicknesses from the first lens element 10 to the fifth lens element 50 along the optical axis I, that is, the minimum value of T1, T2, T3, T4 and T5. Tavg is the average value of the five thicknesses from the first lens element 10 to the fifth lens element 50 along the optical axis I, that is, ALT/5.

In addition, between two adjacent lens elements in the optical imaging lens 1 of the present invention there may be an air gap along the optical axis I. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, and an air gap G45 disposed between the fourth lens element 40 and the fifth lens element 50. Therefore, the sum of four air gaps from the first lens element 10 to the fifth lens element 50 along the optical axis I is AAG, that is, $AAG=G12+G23+G34+G45$. $AAG_1$ is the sum of the air gaps on the optical axis I when the optical imaging lens 1 is in the first focusing state; $AAG_2$ is the sum of the air gaps on the optical axis I when the optical imaging lens 1 is in the second focusing state; $\Delta G$ is the absolute value of the difference of the sum of air gaps of the optical imaging lens 1 in the first focusing state and the second focusing state, i.e. $\Delta G=|AAG_1-AAG_2|$.

In addition, a distance from the object-side surface 11 of the first lens element 10 to the image plane 4 along the optical axis I is TTL, namely a system length of the optical imaging lens 1; a distance from the object-side surface 11 of the first lens element 10 to the image-side surface 52 of the fifth lens element 50 along the optical axis I is TL; ImgH (image height) is the image height of the optical imaging lens 1; Fno is the f-number of the optical imaging lens 1.

When the rear lens group 82 of the optical imaging lens 1 moves along the optical axis I, the effective focal length of the first focusing state formed by the optical imaging lens 1 is EFL, the effective focal length of the second focusing state formed by the optical imaging lens 1 is EFLA. HFOV is half field of view of the optical imaging lens 1, and ΔHFOV is the absolute value of the difference of the half field of view when the optical imaging lens 1 is in the first focusing state and the second focusing state.

When the filter 3 is placed between the fifth lens element 50 and the image plane 4, an air gap between the fifth lens element 50 and the filter 3 along the optical axis I is GSF; a thickness of the filter 3 along the optical axis I is TF; an air gap between the filter 3 and the image plane 4 along the optical axis I is GFP; and a distance from the image-side surface 52 of the fifth lens element 50 to the image plane 4 along the optical axis I is BFL, namely the back focal length of the optical imaging lens 1. Therefore, BFL=G5F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; fG1 is the focal length of the front lens group 81; fG2 is the focal length of the rear lens group 82; n1 is a refractive index of the first lens element 10; n2 is a refractive index of the second lens element 20; n3 is a refractive index of the third lens element 30; n4 is a refractive index of the fourth lens element 40; n5 is a refractive index of the fifth lens element 50; V1 is an Abbe number of the first lens element 10; V2 is an Abbe number of the second lens element 20; V3 is an Abbe number of the third lens element 30; V4 is an Abbe number of the fourth lens element 40; V5 is an Abbe number of the fifth lens element 50.

First Embodiment

Please refer to FIG. 6 which illustrates the first embodiment of the optical imaging lens 1 of the present invention. Please refer to FIGS. 7A-7H, FIG. 7A illustrates the longitudinal spherical aberration on the image plane in the first focusing state of the first embodiment, FIG. 7B illustrates the field curvature aberration on the sagittal direction in the first focusing state of the first embodiment, FIG. 7C illustrates the field curvature aberration on the tangential direction in the first focusing state of the first embodiment, FIG. 7D illustrates the distortion in the first focusing state of the first embodiment, FIG. 7E illustrates the longitudinal spherical aberration on the image plane in the second focusing state of the first embodiment, FIG. 7F illustrates the field curvature aberration on the sagittal direction in the second focusing state of the first embodiment, FIG. 7G illustrates the field curvature aberration on the tangential direction in the second focusing state of the first embodiment, and FIG. 7H illustrates the distortion in the second focusing state of the first embodiment. The Y axis of the spherical aberration in each embodiment is "field of view" for 1.0. The Y axis of the astigmatic field and the distortion in each embodiment stands for "image height" (ImgH), which is 3.500 mm.

The optical imaging lens 1 of the first embodiment mainly comprises an aperture stop 2, a front lens group 81, a rear lens group 82 and an image plane 4. The aperture stop 2 of the first embodiment is disposed on the side of the first lens element 10 in the front lens group 81 facing the object side A1. The front lens group 81 and the rear lens group 82 have a total of five lens elements with refracting power. Namely, the first lens element 10, the second lens element 20, the third lens element 30, the fourth lens element 40 and the fifth lens element 50, the front lens group 81 includes the first lens element 10, the second lens element 20 and the third lens element 30, and the rear lens group 82 includes the fourth lens element 40 and the fifth lens element 50.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has negative refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is concave, and a periphery region 27 of the image-side surface 22 of the second lens element 20 is concave. Besides, both the object-side surface 21 and the image-side surface 22 of the second lens element 20 are aspheric surfaces, but it is not limited thereto.

The third lens element 30 has positive refracting power. An optical axis region 33 of the object-side surface 31 of the third lens element 30 is convex, and a periphery region 34 of the object-side surface 31 of the third lens element 30 is concave. An optical axis region 36 of the image-side surface 32 of the third lens element 30 is convex, and a periphery region 37 of the image-side surface 32 of the third lens element 30 is convex. Besides, both the object-side surface 31 and the image-side surface 32 of the third lens element 30 are aspheric surfaces, but it is not limited thereto.

The fourth lens element 40 has positive refracting power. An optical axis region 43 of the object-side surface 41 of the fourth lens element 40 is concave, and a periphery region 44 of the object-side surface 41 of the fourth lens element 40 is convex. An optical axis region 46 of the image-side surface 42 of the fourth lens element 40 is convex, and a periphery region 47 of the image-side surface 42 of the fourth lens element 40 is concave. Besides, both the object-side surface 41 and the image-side surface 42 of the fourth lens element 40 are aspheric surfaces, but it is not limited thereto.

The fifth lens element 50 has negative refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is concave, and a periphery region 57 of the image-side surface 52 of the fifth lens element 50 is convex. Besides, both the object-side surface 51 and the image-side surface 52 of the fifth lens element 50 are aspheric surfaces, but it is not limited thereto.

In the first lens element 10, the second lens element 20, the third lens element 30, the fourth lens element 40 and the fifth lens element 50 of the optical imaging lens 1 of the present invention, there are 10 surfaces, such as the object-side surfaces 11/21/31/41/51 and the image-side surfaces 12/22/32/42/52. If a surface is aspheric, these aspheric coefficients are defined according to the following formula:

$$Z(Y) = \frac{Y^2}{R} \left/ \left( 1 + \sqrt{1 - (1+K)\frac{Y^2}{R^2}} \right) \right. + \sum_{i=1}^{n} a_i \times Y^i$$

In which:

Y represents a vertical distance from a point on the aspheric surface to the optical axis;

Z represents the depth of an aspheric surface (the perpendicular distance between the point of the aspheric surface at a distance Y from the optical axis and the tangent plane of the vertex on the optical axis of the aspheric surface);

R represents the radius of curvature the lens element surface;

K is a conic constant; and $a_i$ is the aspheric coefficient of the $i^{th}$ order, in which the $a_2$ coefficient of each embodiment is 0.

The optical data of the first embodiment of the optical imaging lens 1 are shown in FIG. 22 while the aspheric surface data are shown in FIG. 23. In the present embodiments of the optical imaging lens, the f-number of the entire optical imaging lens element system is Fno, EFL is the effective focal length of the first focusing state, EFLA is an effective focal length of the second focusing state, HFOV stands for the half field of view which is half of the field of view of the entire optical imaging lens, and the unit for the image height, the radius of curvature, the thickness and the focal length is in millimeters (mm). In this embodiment, EFL=13.873 mm, EFLA=9.629 mm, Fno of the first focusing state=3.089, Fno of the second focusing state=2.144, HFOV of the first focusing state=14.080 degrees, HFOV of the second focusing state=13.522 degrees, the focal length of the front lens group 81=8.024 mm, the focal length of the rear lens group 82=−9.642 mm, TTL=14.335 mm, ImgH=3.500 mm.

Second Embodiment

Figure 8:
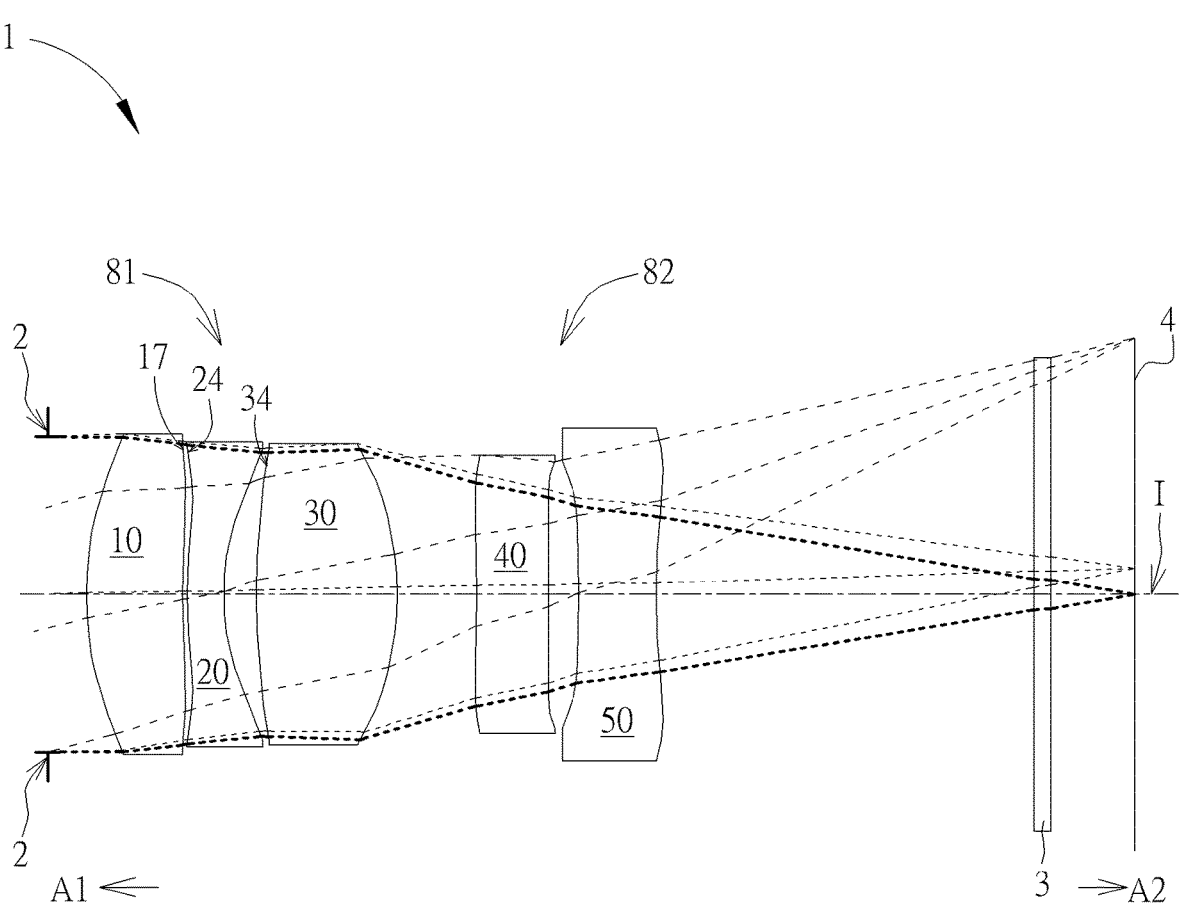
FIG. 8 illustrates a second embodiment of the optical imaging lens of the present invention.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the portion in a vicinity of the optical axis and the portion in a vicinity of its periphery will be omitted in the following embodiments. Please refer to FIGS. 9A-9H, FIG. 9A illustrates the longitudinal spherical aberration on the image plane in the first focusing state of the second embodiment, FIG. 9B illustrates the field curvature aberration on the sagittal direction in the first focusing state of the second embodiment, FIG. 9C illustrates the field curvature aberration on the tangential direction in the first focusing state of the second embodiment, FIG. 9D illustrates the distortion in the first focusing state of the second embodiment, FIG. 9E illustrates the longitudinal spherical aberration on the image plane in the second focusing state of the second embodiment, FIG. 9F illustrates the field curvature aberration on the sagittal direction in the second focusing state of the second embodiment, FIG. 9G illustrates the field curvature aberration on the tangential direction in the second focusing state of the second embodiment, FIG. 9H illustrates the distortion in the second focusing state of the second embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the periphery region 17 of the image-side surface 12 of the first lens element 10 is convex, the periphery region 24 of the object-side surface 21 of the second lens element 20 is concave, the periphery region 34 of the object-side surface 31 of the third lens element 30 is convex, and the fourth lens element 40 has negative refracting power.

The optical data of the second embodiment of the optical imaging lens are shown in FIG. 24 while the aspheric surface data are shown in FIG. 25. In this embodiment, EFL=13.299 mm, EFLA=9.433 mm, Fno of the first focusing state=3.072, Fno of the second focusing state=2.235, HFOV of the first focusing state=14.769 degrees, HFOV of the second focusing state=14.386 degrees, the focal length of the front lens group 81=7.800 mm, the focal length of the rear lens group 82=−9.796 mm, TTL=14.357 mm, ImgH=3.500 mm. In particular: 1. The field curvature aberration on the sagittal direction of the first focusing state of this embodiment is better than the field curvature aberration on the sagittal direction of the first focusing state of the first embodiment; 2. The field curvature aberration on the tangential direction in the first focusing state of this embodiment is better than the field curvature aberration on the tangential direct in the tangential direction in the first focusing state of the first embodiment; 3. The distortion aberration of the first focusing state of this embodiment is better than the distortion aberration of the first focusing state of the first embodiment; 4. The field curvature aberration on the sagittal direction of the second focusing state of this embodiment is better than the field curvature aberration on the sagittal direction of the second focusing state of the first embodiment; 5. The field curvature aberration on the tangential direction in the second focusing state of this embodiment is better than the field curvature aberration on the tangential direct in the tangential direction in the second focusing state of the first embodiment; 6. The distortion aberration of the second focusing state of this embodiment is better than the distortion aberration of the second focusing state of the first embodiment.

Third Embodiment

Figure 10:
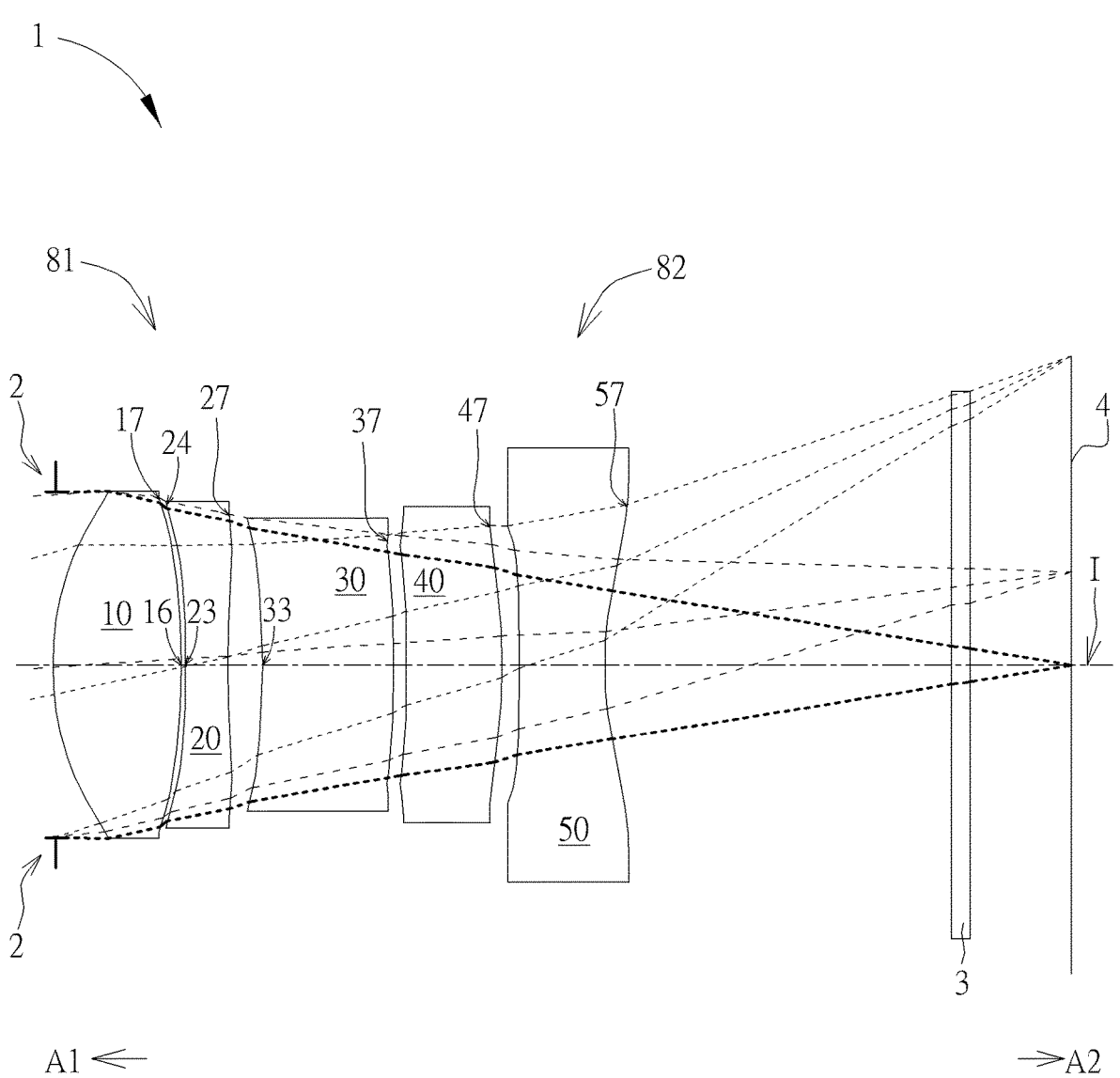
FIG. 10 illustrates a third embodiment of the optical imaging lens of the present invention.
Figures 11A, 11B, 11C, 11D:
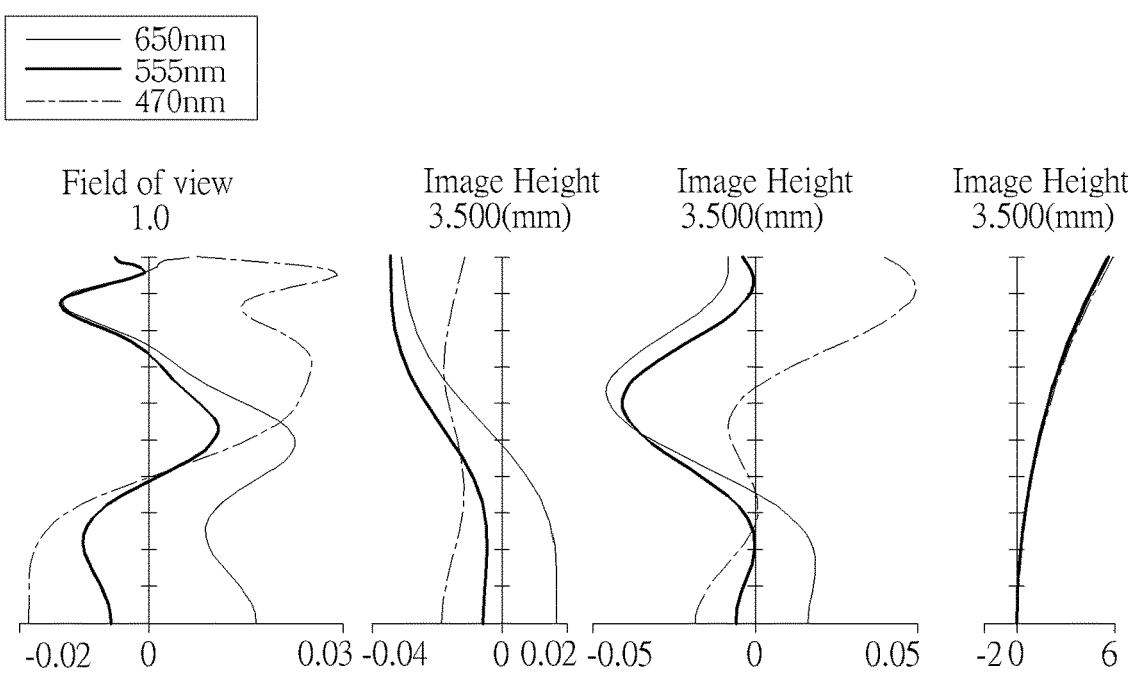
FIG. 11A illustrates the longitudinal spherical aberration on the image plane in the first focusing state of the third embodiment.
FIG. 11B illustrates the field curvature aberration on the sagittal direction in the first focusing state of the third embodiment.
FIG. 11C illustrates the field curvature aberration on the tangential direction in the first focusing state of the third embodiment.
FIG. 11D illustrates the distortion in the first focusing state of the third embodiment.
Figures 11E, 11F, 11G, 11H:
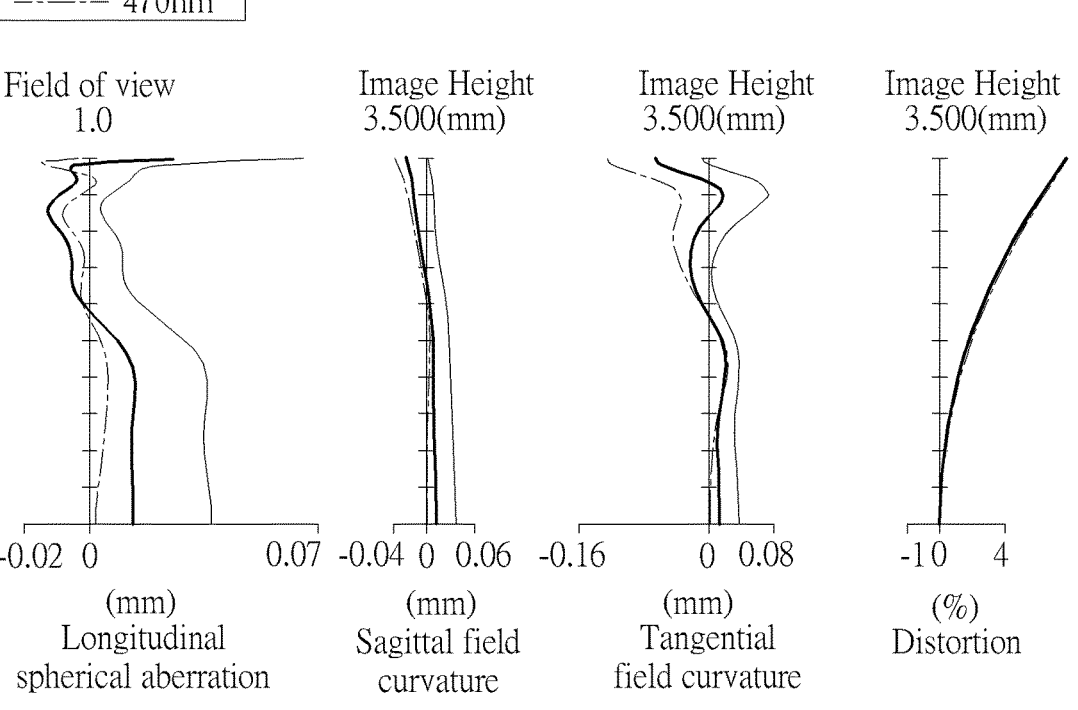
FIG. 11E illustrates the longitudinal spherical aberration on the image plane in the second focusing state of the third embodiment.
FIG. 11F illustrates the field curvature aberration on the sagittal direction in the second focusing state of the third embodiment.
FIG. 11G illustrates the field curvature aberration on the tangential direction in the second focusing state of the third embodiment.
FIG. 11H illustrates the distortion in the second focusing state of the third embodiment.

Please refer to FIG. 10 which illustrates the third embodiment of the optical imaging lens 1 of the present invention. Please refer to FIGS. 11A-11H, FIG. 11A illustrates the longitudinal spherical aberration on the image plane in the first focusing state of the third embodiment, FIG. 11B illustrates the field curvature aberration on the sagittal direction in the first focusing state of the third embodiment, FIG. 11C illustrates the field curvature aberration on the tangential direction in the first focusing state of the third embodiment, FIG. 11D illustrates the distortion in the first focusing state of the third embodiment, FIG. 11E illustrates the longitudinal spherical aberration on the image plane in the second focusing state of the third embodiment, FIG. 11F illustrates the field curvature aberration on the sagittal direction in the second focusing state of the third embodiment, FIG. 11G illustrates the field curvature aberration on the tangential direction in the second focusing state of the third embodiment, FIG. 11H illustrates the distortion in the second focusing state of the third embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the optical axis region 16 of the image-side surface 12 of the first lens element 10 is convex, the periphery region 17 of the image-side surface 12 of the first lens element 10 is convex, the optical axis region 23 of the object-side surface 21 of the second lens element 20 is concave, the periphery region 24 of the object-side surface 21 of the second lens element 20 is concave, the periphery region 27 of the image-side surface 22 of the second lens element 20 is convex, the third lens element 30 has negative refracting power, the optical axis region 33 of the object-side surface 31 of the third lens element 30 is concave, the periphery region 37 of the image-side surface 32 of the third lens element 30 is concave, the periphery region 47 of the image-side surface 42 of the fourth lens element 40 is convex, the periphery region 57 of the image-side surface 52 of the fifth lens element 50 is concave.

The optical data of the third embodiment of the optical imaging lens are shown in FIG. 26 while the aspheric surface data are shown in FIG. 27. In this embodiment, EFL=11.986 mm, EFLA=8.097 mm, Fno of the first focusing state=3.070, Fno of the second focusing state=2.074, HFOV of the first focusing state=15.440 degrees, HFOV of the second focusing state=14.925 degrees, the focal length of the front lens group 81=7.640 mm, the focal length of the rear lens group 82=−9.275 mm, TTL=11.552 mm, ImgH=3.500 mm. In particular: 1. The system length TTL of the optical imaging lens in this embodiment is shorter than the system length TTL of the optical imaging lens in the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The field curvature aberration on the sagittal direction of the second focusing state of this embodiment is better than the field curvature aberration on the sagittal direction of the second focusing state of the first embodiment; 5. The field curvature aberration on the tangential direction in the second focusing state of this embodiment is better than the field curvature aberration on the tangential direct in the tangential direction in the second focusing state of the first embodiment.

Fourth Embodiment

Figure 12:
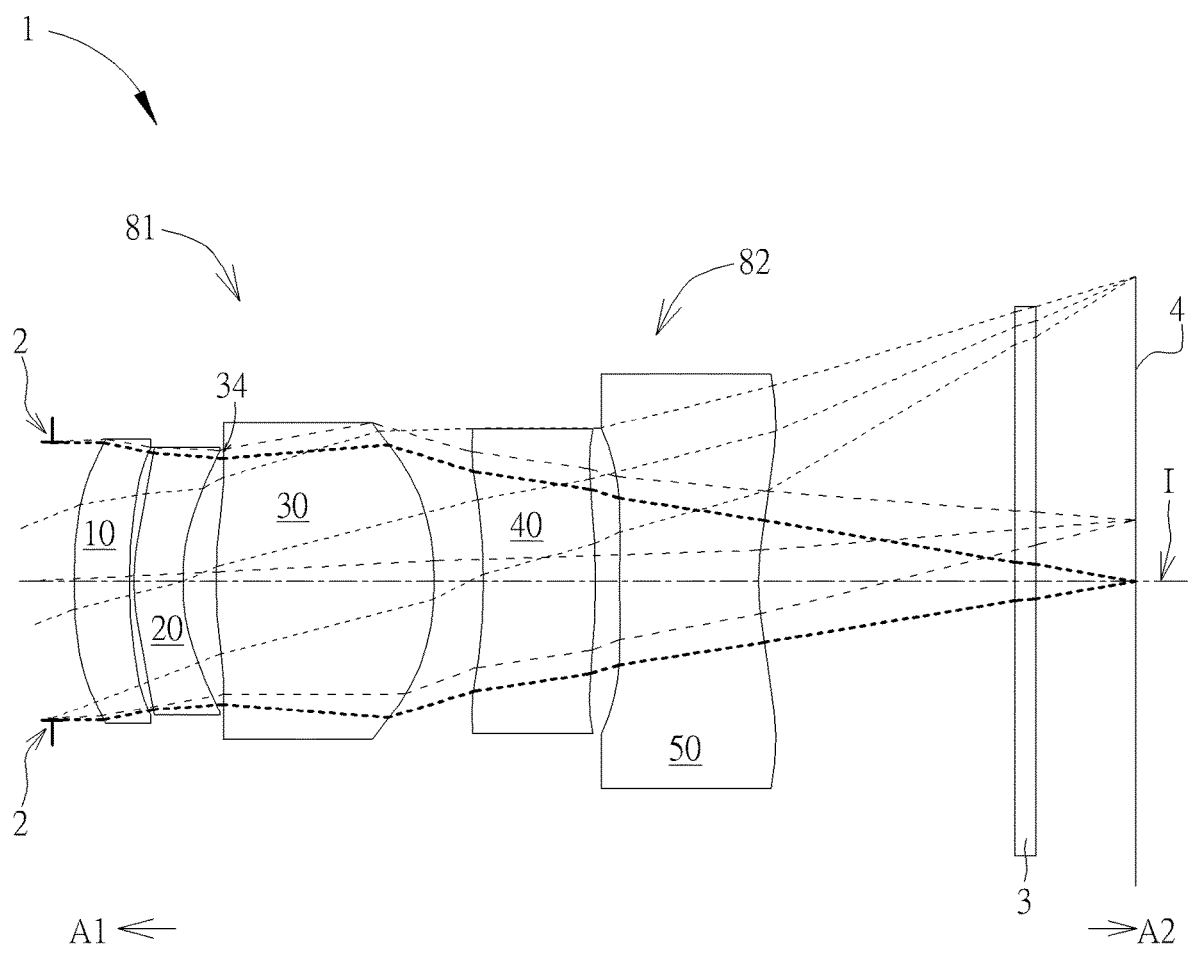
FIG. 12 illustrates a fourth embodiment of the optical imaging lens of the present invention.

Please refer to FIG. 12 which illustrates the fourth embodiment of the optical imaging lens 1 of the present invention. Please refer to FIGS. 13A-13H, FIG. 13A illustrates the longitudinal spherical aberration on the image plane in the first focusing state of the fourth embodiment, FIG. 13B illustrates the field curvature aberration on the sagittal direction in the first focusing state of the fourth embodiment, FIG. 13C illustrates the field curvature aberration on the tangential direction in the first focusing state of the fourth embodiment, FIG. 13D illustrates the distortion in the first focusing state of the fourth embodiment, FIG. 13E illustrates the longitudinal spherical aberration on the image plane in the second focusing state of the fourth embodiment, FIG. 13F illustrates the field curvature aberration on the sagittal direction in the second focusing state of the fourth embodiment, FIG. 13G illustrates the field curvature aberration on the tangential direction in the second focusing state of the fourth embodiment, FIG. 13H illustrates the distortion in the second focusing state of the fourth embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the first lens element 10 has negative refracting power, the second lens element 20 has positive refracting power, the periphery region 34 of the object-side surface 31 of the third lens element 30 is convex, the fourth lens element 40 has negative refracting power.

The optical data of the fourth embodiment of the optical imaging lens are shown in FIG. 28 while the aspheric surface data are shown in FIG. 29. In this embodiment, EFL=9.773 mm, EFLA=7.655 mm, Fno of the first focusing state=3.070, Fno of the second focusing state=2.405, HFOV of the first focusing state=20.235 degrees, HFOV of the second focusing state=20.182 degrees, the focal length of the front lens group 81=5.123 mm, the focal length of the rear lens group 82=−5.498 mm, TTL=12.236 mm, ImgH=3.500 mm. In particular: 1. The system length TTL of the optical imaging lens in this embodiment is shorter than the system length TTL of the optical imaging lens in the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The field curvature aberration on the sagittal direction of the second focusing state of this embodiment is better than the field curvature aberration on the sagittal direction of the second focusing state of the first embodiment; 5. The field curvature aberration on the tangential direction in the second focusing state of this embodiment is better than the field curvature aberration on the tangential direct in the tangential direction in the second focusing state of the first embodiment.

Fifth Embodiment

Figure 14:
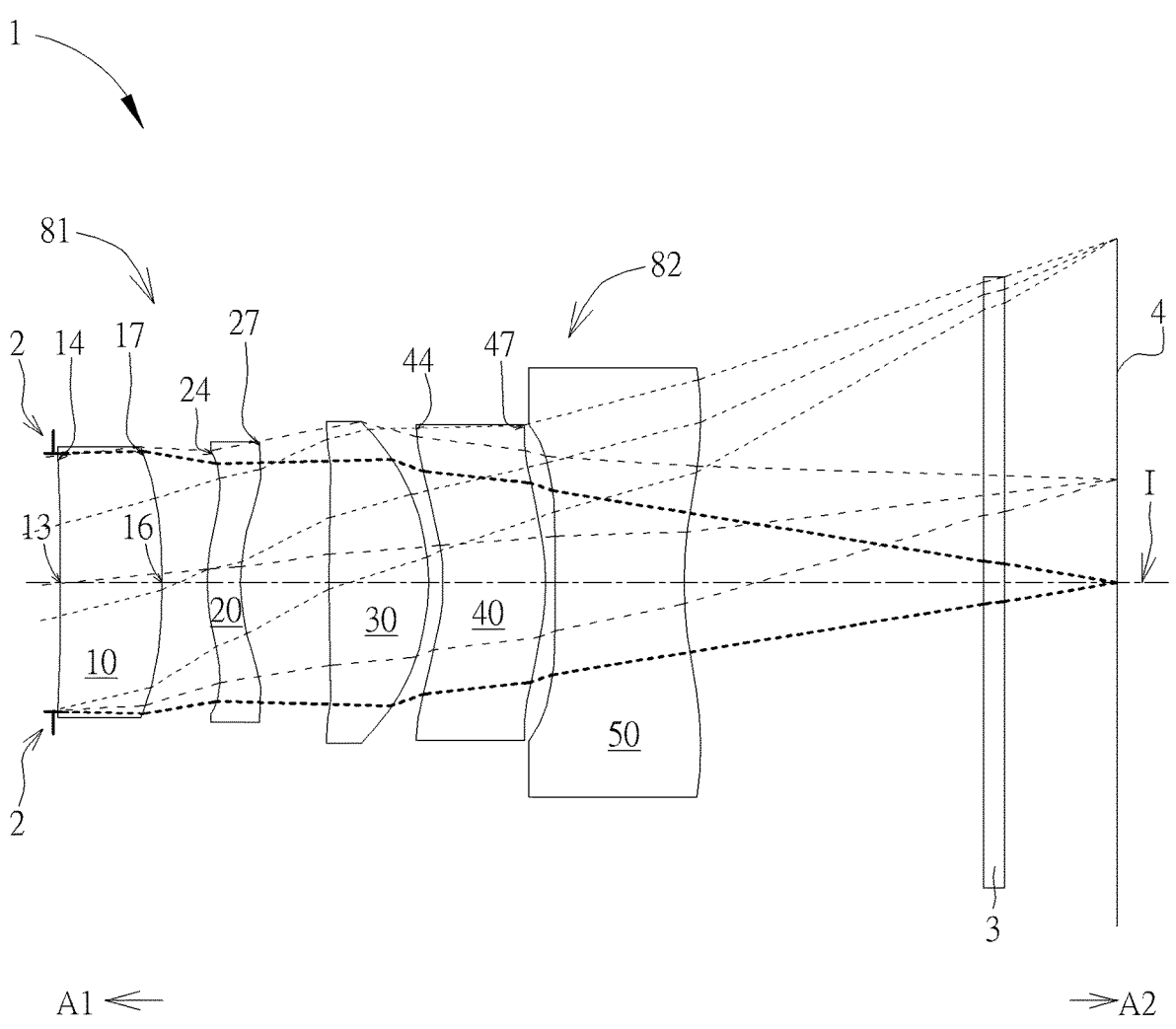
FIG. 14 illustrates a fifth embodiment of the optical imaging lens of the present invention.

Please refer to FIG. 14 which illustrates the fifth embodiment of the optical imaging lens 1 of the present invention. Please refer to FIGS. 15A-15H, FIG. 15A illustrates the longitudinal spherical aberration on the image plane in the first focusing state of the fifth embodiment, FIG. 15B illustrates the field curvature aberration on the sagittal direction in the first focusing state of the fifth embodiment, FIG. 15C illustrates the field curvature aberration on the tangential direction in the first focusing state of the fifth embodiment, FIG. 15D illustrates the distortion in the first focusing state of the fifth embodiment, FIG. 15E illustrates the longitudinal spherical aberration on the image plane in the second focusing state of the fifth embodiment, FIG. 15F illustrates the field curvature aberration on the sagittal direction in the second focusing state of the fifth embodiment, FIG. 15G illustrates the field curvature aberration on the tangential direction in the second focusing state of the fifth embodiment, FIG. 15H illustrates the distortion in the second focusing state of the fifth embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the optical axis region 13 of the object-side surface 11 of the first lens element 10 is concave, the periphery region 14 of the object-side surface 11 of the first lens element 10 is concave, the optical axis region 16 of the image-side surface 12 of the first lens element 10 is convex, the periphery region 17 of the image-side surface 12 of the first lens element 10 is convex, the periphery region 24 of the object-side surface 21 of the second lens element 20 is concave, the periphery region 27 of the image-side surface 22 of the second lens element 20 is convex, the periphery region 44 of the object-side surface 41 of the fourth lens element 40 is concave, the periphery region 47 of the image-side surface 42 of the fourth lens element 40 is convex.

The optical data of the fifth embodiment of the optical imaging lens are shown in FIG. 30 while the aspheric surface data are shown in FIG. 31. In this embodiment, EFL=8.036 mm, EFLA=6.832 mm, Fno of the first focusing state=3.070, Fno of the second focusing state=2.610, HFOV of the first focusing state=23.279 degrees, HFOV of the second focusing state=23.067 degrees, the focal length of the front lens group 81=3.860 mm, the focal length of the rear lens group 82=−4.799 mm, TTL=10.807 mm, ImgH=3.500 mm. In particular: 1. The system length TTL of the optical imaging lens in this embodiment is shorter than the system length TTL of the optical imaging lens in the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The field curvature aberration on the sagittal direction of the second focusing state of this embodiment is better than the field curvature aberration on the sagittal direction of the second focusing state of the first embodiment; 5. The field curvature aberration on the tangential direction in the second focusing state of this embodiment is better than the field curvature aberration on the tangential direct in the tangential direction in the second focusing state of the first embodiment.

Sixth Embodiment

Figure 16:
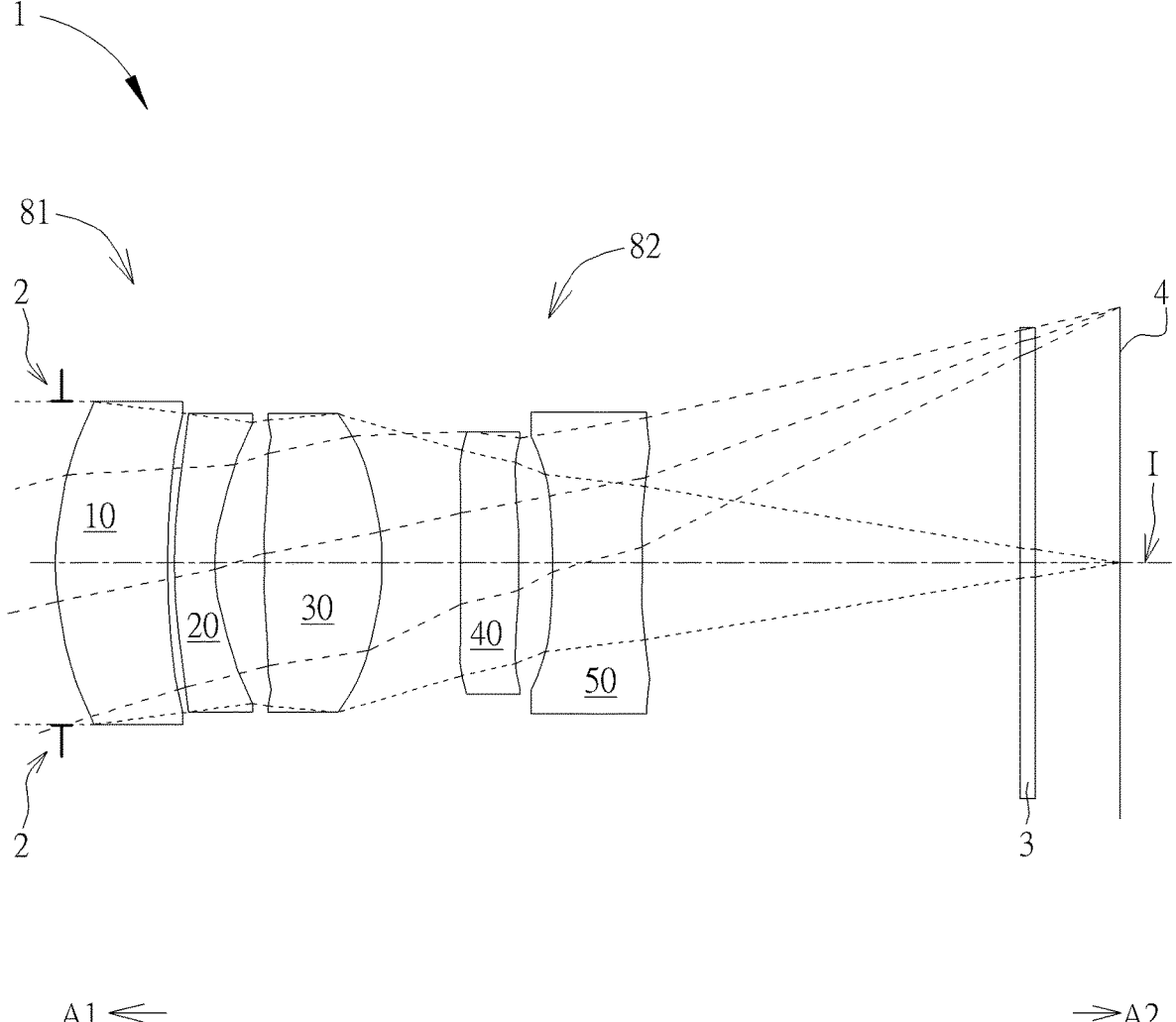
FIG. 16 illustrates a sixth embodiment of the optical imaging lens of the present invention.

Please refer to FIG. 16 which illustrates the sixth embodiment of the optical imaging lens 1 of the present invention. Please refer to FIGS. 17A-17H, FIG. 17A illustrates the longitudinal spherical aberration on the image plane in the first focusing state of the sixth embodiment, FIG. 17B illustrates the field curvature aberration on the sagittal direction in the first focusing state of the sixth embodiment, FIG. 17C illustrates the field curvature aberration on the tangential direction in the first focusing state of the sixth embodiment, FIG. 17D illustrates the distortion in the first focusing state of the sixth embodiment, FIG. 17E illustrates the longitudinal spherical aberration on the image plane in the second focusing state of the sixth embodiment, FIG. 17F illustrates the field curvature aberration on the sagittal direction in the second focusing state of the sixth embodiment, FIG. 17G illustrates the field curvature aberration on the tangential direction in the second focusing state of the sixth embodiment, FIG. 17H illustrates the distortion in the second focusing state of the sixth embodiment.

The components in this embodiment are similar to those in the first embodiment, but the optical data such as the lens element refracting power, the radius of curvature, the lens element thickness, the aspheric surface or the back focal length in this embodiment are different from the optical data in the first embodiment.

The optical data of the sixth embodiment of the optical imaging lens are shown in FIG. 32 while the aspheric surface data are shown in FIG. 33. In this embodiment, EFL=13.829 mm, EFLA=9.544 mm, Fno of the first focusing state=3.093, Fno of the second focusing state=2.240, HFOV of the first focusing state=14.124 degrees, HFOV of the second focusing state=13.481 degrees, the focal length of the front lens group 81=7.936 mm, the focal length of the rear lens group 82=−9.169 mm, TTL=14.601 mm, ImgH=3.500 mm. In particular: 1. The longitudinal spherical aberration of the first focusing state of this embodiment is better than the longitudinal spherical aberration of the first focusing state of the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The longitudinal spherical aberration of the second focusing state of this embodiment is better than the longitudinal spherical aberration of the second focusing state of the first embodiment; 5. The field curvature aberration on the sagittal direction of the second focusing state of this embodiment is better than the field curvature aberration on the sagittal direction of the second focusing state of the first embodiment; 6. The field curvature aberration on the tangential direction in the second focusing state of this embodiment is better than the field curvature aberration on the tangential direct in the tangential direction in the second focusing state of the first embodiment.

Seventh Embodiment

Figure 18:
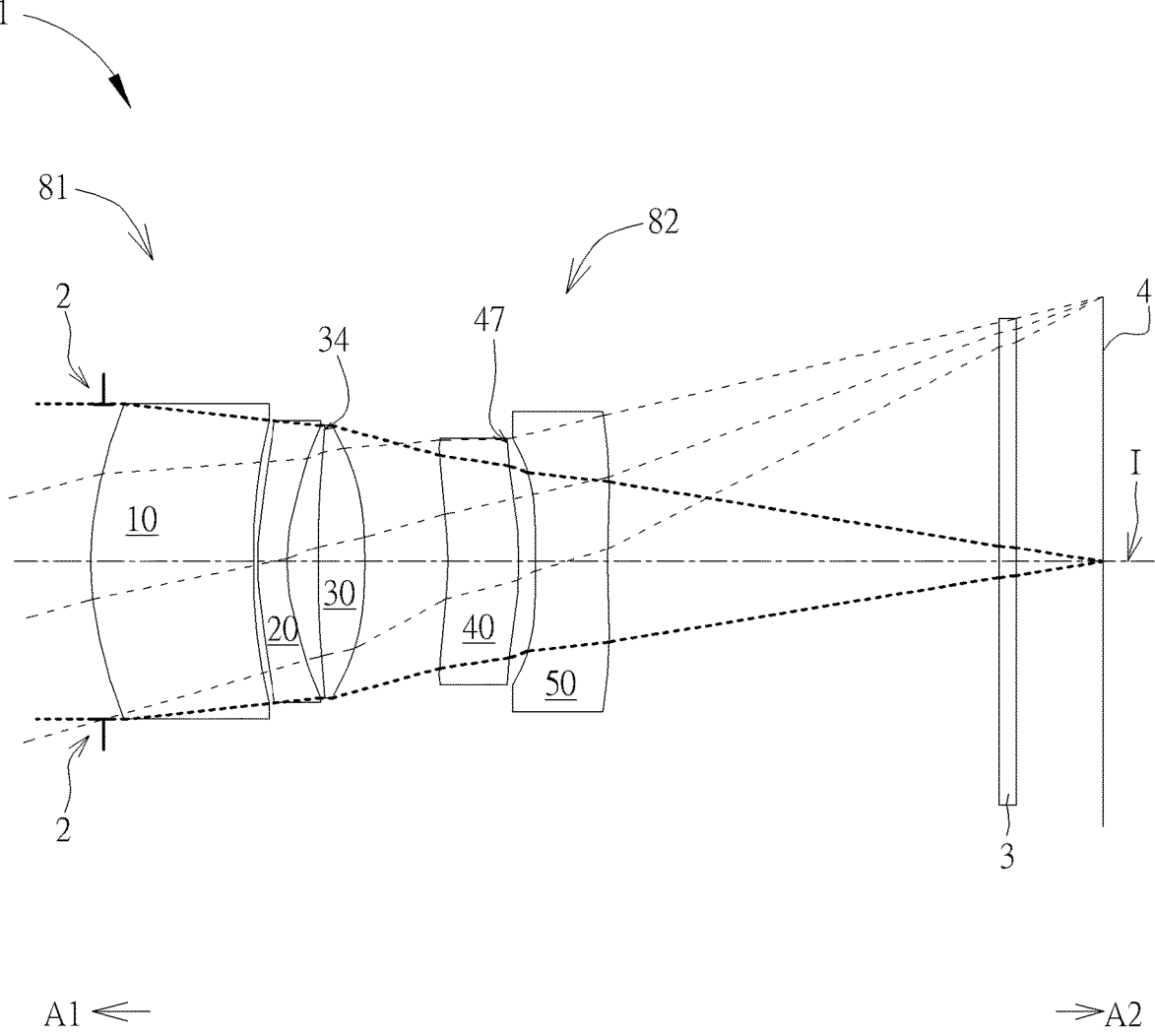
FIG. 18 illustrates a seventh embodiment of the optical imaging lens of the present invention.

Please refer to FIG. 18 which illustrates the seventh embodiment of the optical imaging lens 1 of the present invention. Please refer to FIGS. 19A-19H, FIG. 19A illustrates the longitudinal spherical aberration on the image plane in the first focusing state of the seventh embodiment, FIG. 19B illustrates the field curvature aberration on the sagittal direction in the first focusing state of the seventh embodiment, FIG. 19C illustrates the field curvature aberration on the tangential direction in the first focusing state of the seventh embodiment, FIG. 19D illustrates the distortion in the first focusing state of the seventh embodiment, FIG. 19E illustrates the longitudinal spherical aberration on the image plane in the second focusing state of the seventh embodiment, FIG. 19F illustrates the field curvature aberration on the sagittal direction in the second focusing state of the seventh embodiment, FIG. 19G illustrates the field curvature aberration on the tangential direction in the second focusing state of the seventh embodiment, FIG. 19H illustrates the distortion in the second focusing state of the seventh embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the periphery region 47 of the image-side surface 42 of the fourth lens element 40 is convex.

The optical data of the seventh embodiment of the optical imaging lens are shown in FIG. 34 while the aspheric surface data are shown in FIG. 35. In this embodiment, EFL=12.901 mm, EFLA=9.436 mm, Fno of the first focusing state=3.082, Fno of the second focusing state=2.341, HFOV of the first focusing state=15.126 degrees, HFOV of the second focusing state=13.732 degrees, the focal length of the front lens group 81=7.701 mm, the focal length of the rear lens group 82=−10.764 mm, TTL=13.404 mm, ImgH=3.500 mm. In particular: 1. The longitudinal spherical aberration of the first focusing state of this embodiment is better than the longitudinal spherical aberration of the first focusing state of the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The longitudinal spherical aberration of the second focusing state of this embodiment is better than the longitudinal spherical aberration of the second focusing state of the first embodiment; 5. The field curvature aberration on the sagittal direction of the second focusing state of this embodiment is better than the field curvature aberration on the sagittal direction of the second focusing state of the first embodiment; 6. The field curvature aberration on the tangential direction in the second focusing state of this embodiment is better than the field curvature aberration on the tangential direct in the tangential direction in the second focusing state of the first embodiment; 7. The system length TTL of the optical imaging lens in this embodiment is shorter than the system length TTL of the optical imaging lens in the first embodiment.

Eighth Embodiment

Figure 20:
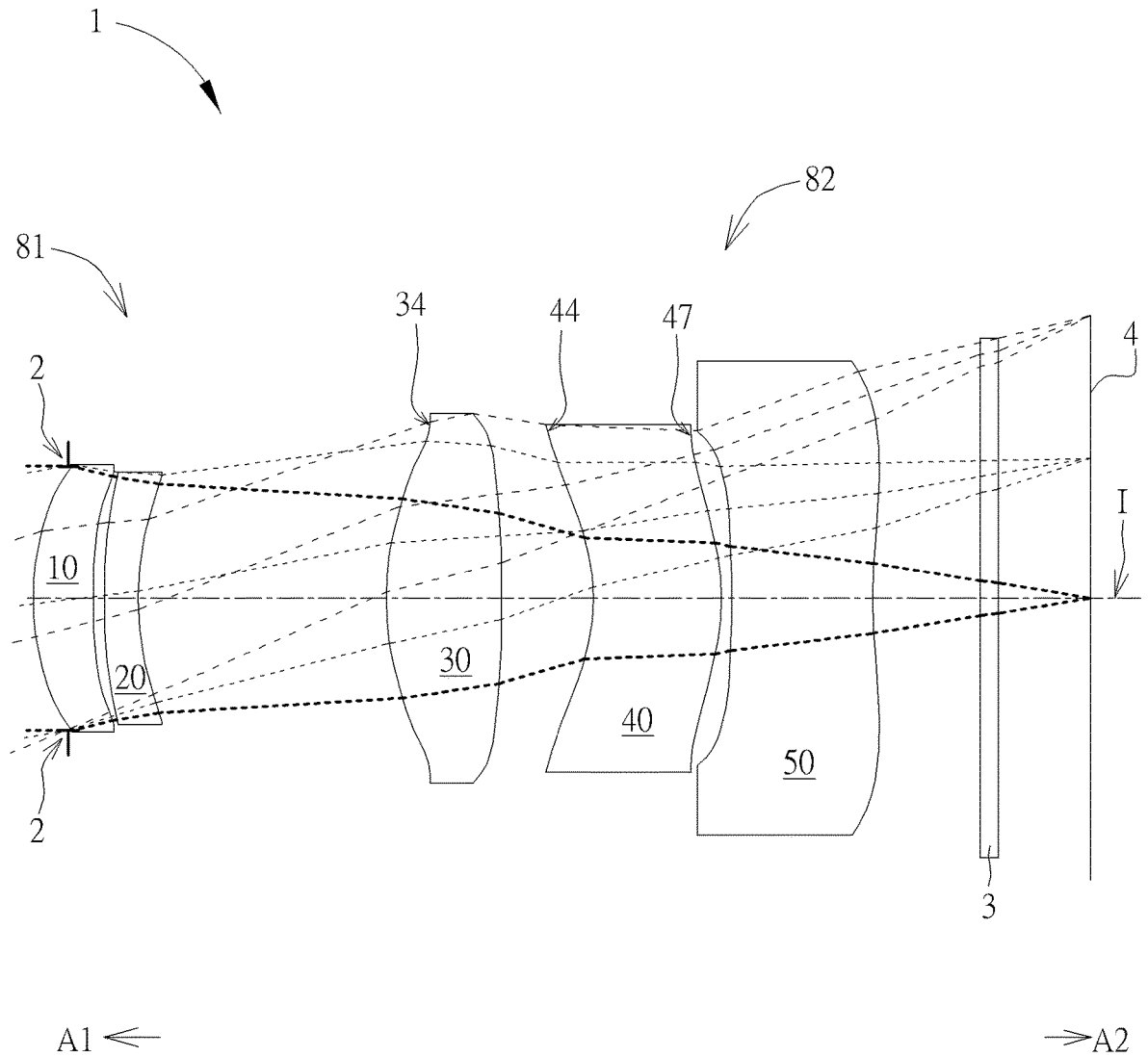
FIG. 20 illustrates an eighth embodiment of the optical imaging lens of the present invention.
Figures 21A, 21B, 21C, 21D:
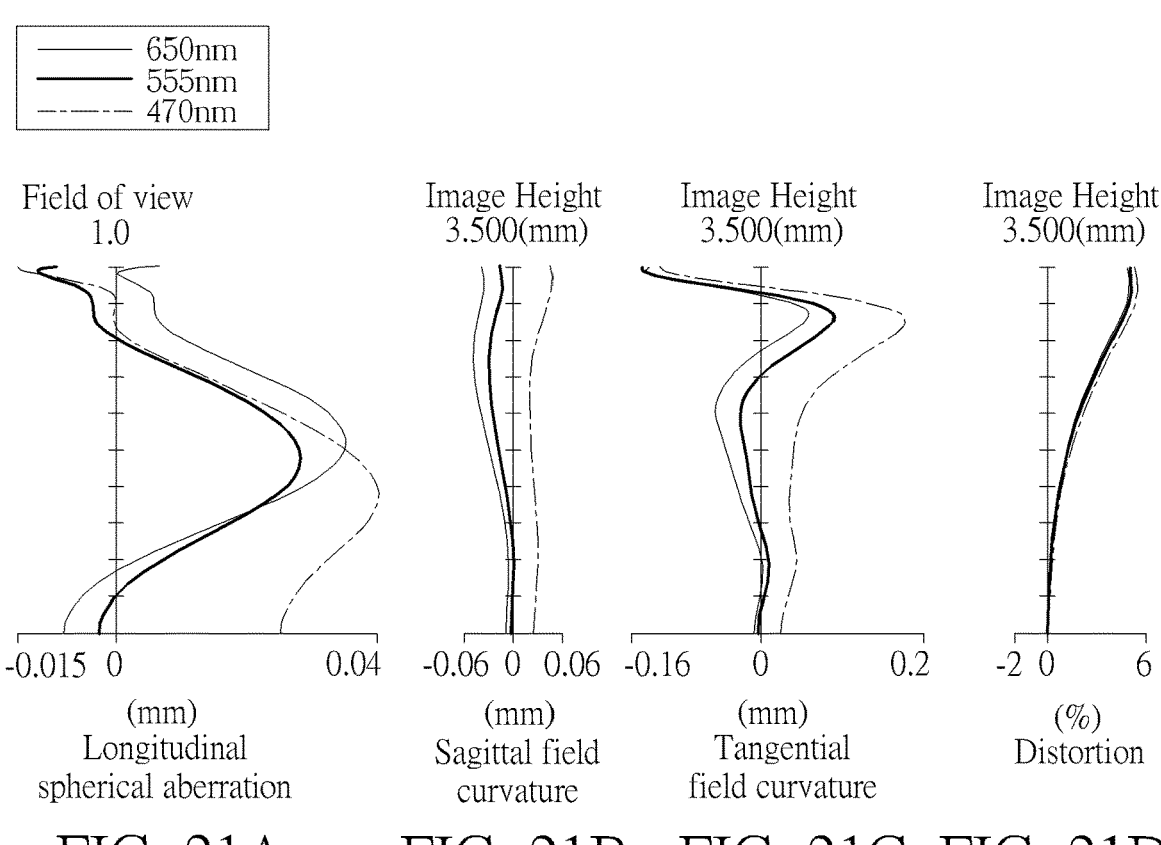
FIG. 21A illustrates the longitudinal spherical aberration on the image plane in the first focusing state of the eighth embodiment.
FIG. 21B illustrates the field curvature aberration on the sagittal direction in the first focusing state of the eighth embodiment.
FIG. 21C illustrates the field curvature aberration on the tangential direction in the first focusing state of the eighth embodiment.
FIG. 21D illustrates the distortion in the first focusing state of the eighth embodiment.
Figures 21E, 21F, 21G, 21H:
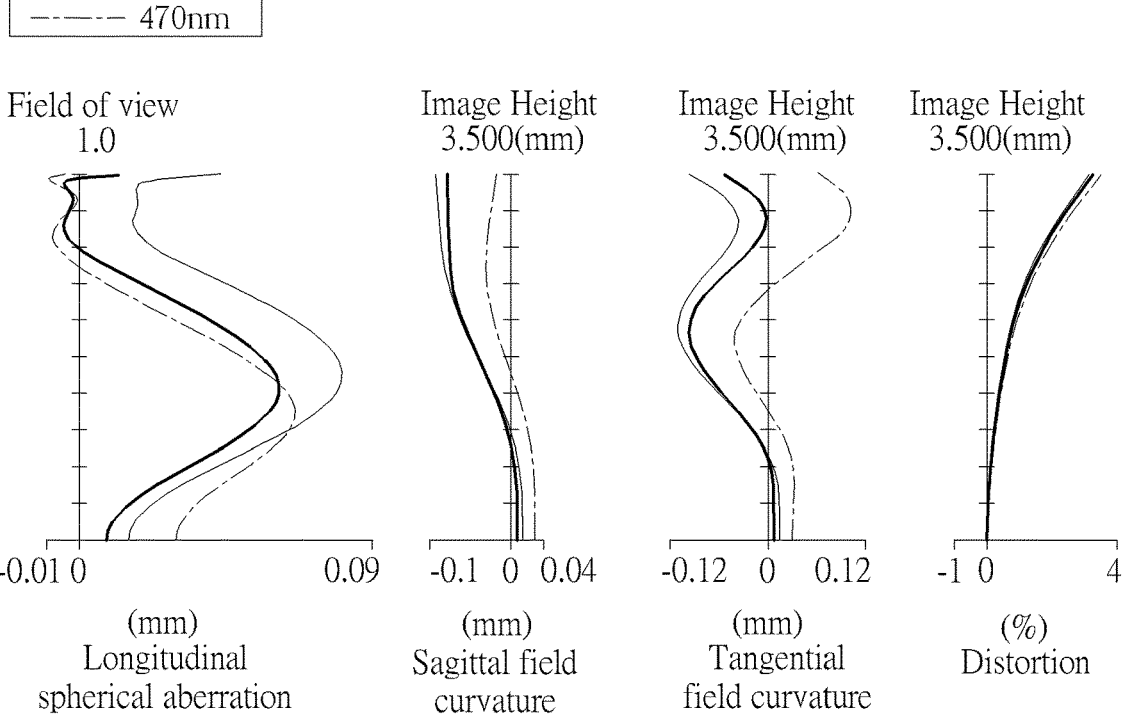
FIG. 21E illustrates the longitudinal spherical aberration on the image plane in the second focusing state of the eighth embodiment.
FIG. 21F illustrates the field curvature aberration on the sagittal direction in the second focusing state of the eighth embodiment.
FIG. 21G illustrates the field curvature aberration on the tangential direction in the second focusing state of the eighth embodiment.
FIG. 21H illustrates the distortion in the second focusing state of the eighth embodiment.

Please refer to FIG. 20 which illustrates the eighth embodiment of the optical imaging lens 1 of the present invention. Please refer to FIGS. 21A-21H, FIG. 21A illustrates the longitudinal spherical aberration on the image plane in the first focusing state of the eighth embodiment, FIG. 21B illustrates the field curvature aberration on the sagittal direction in the first focusing state of the eighth embodiment, FIG. 21C illustrates the field curvature aberration on the tangential direction in the first focusing state of the eighth embodiment, FIG. 21D illustrates the distortion in the first focusing state of the eighth embodiment, FIG. 21E illustrates the longitudinal spherical aberration on the image plane in the second focusing state of the eighth embodiment, FIG. 21F illustrates the field curvature aberration on the sagittal direction in the second focusing state of the eighth embodiment, FIG. 21G illustrates the field curvature aberration on the tangential direction in the second focusing state of the eighth embodiment, FIG. 21H illustrates the distortion in the second focusing state of the eighth embodiment. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the front lens group 81 includes the first lens element 10 and the second lens element 20, and the rear lens group 82 includes the third lens element 30, the fourth lens element 40 and the fifth lens element 50. The periphery region 34 of the object-side surface 31 of the third lens element 30 is convex, the fourth lens element 40 has negative refracting power, the periphery region 44 of the object-side surface 41 of the fourth lens element 40 is concave, and the periphery region 47 of the image-side surface 42 of the fourth lens element 40 is convex.

The optical data of the eighth embodiment of the optical imaging lens are shown in FIG. 36 while the aspheric surface data are shown in FIG. 37. In this embodiment, EFL=10.190 mm, EFLA=9.482 mm, Fno of the first focusing state=3.080, Fno of the second focusing state=2.866, HFOV of the first focusing state=18.086 degrees, HFOV of the second focusing state=15.098 degrees, the focal length of the front lens group 81=27.912 mm, the focal length of the rear lens group 82=13.415 mm, TTL=13.171 mm, ImgH=3.500 mm. In particular: 1. The longitudinal spherical aberration of the first focusing state of this embodiment is better than the longitudinal spherical aberration of the first focusing state of the first embodiment; 2. The field curvature aberration on the sagittal direction of the first focusing state of this embodiment is better than the field curvature aberration on the sagittal direction of the first focusing state of the first embodiment; 3. The field curvature aberration on the tangential direction in the first focusing state of this embodiment is better than the field curvature aberration on the tangential direct in the tangential direction in the first focusing state of the first embodiment; 4. The longitudinal spherical aberration of the second focusing state of this embodiment is better than the longitudinal spherical aberration of the second focusing state of the first embodiment; 5. The field curvature aberration on the sagittal direction of the second focusing state of this embodiment is better than the field curvature aberration on the sagittal direction of the second focusing state of the first embodiment; 6. The field curvature aberration on the tangential direction in the second focusing state of this embodiment is better than the field curvature aberration on the tangential direct in the tangential direction in the second focusing state of the first embodiment; 7. The system length TTL of the optical imaging lens in this embodiment is shorter than the system length TTL of the optical imaging lens in the first embodiment.

In addition, the important ratios of the first focusing state and the second focusing state of each embodiment are respectively arranged in FIG. 38 and FIG. 39.

Embodiments of the present invention provide an optical imaging lens having five lens elements with small size, focusing function, excellent imaging quality, good optical performance and technical feasibility. For example, the design of the following lens element's surface shape and lens element's refracting power or parameters can effectively optimize the imaging quality of the optical imaging lens 1 of the present invention, and the corresponding efficacy can be achieved:

1. When the fifth lens element 50 has negative refracting power, the optical axis region 53 of the object-side surface 51 of the fifth lens element 50 is concave, and the optical axis region 56 of the image side 52 of the fifth lens element 50 is concave, the aberration caused by the first lens element 10 to the fourth lens element 40 can be corrected, and also beneficial to the convergence of imaging rays. When the object moves from infinity to macro, the optical imaging lens 1 correspondingly forms the first and second focusing states to achieve the purpose of focusing. However, when the two focusing states meet the condition of (TTL*ΔHFOV)/ΔG≤19.000 degrees, the system length of the optical imaging lens 1 can be fixed, and good imaging quality can be maintained in the focusing process, in which the preferable range of (TTL*ΔHFOV)/ΔG is 0.750 degrees≤(TTL*ΔHFOV)/ΔG≤19.000 degrees.

2. When the optical axis region 36 of the image-side surface 32 of the third lens element 30 is convex and the optical axis region 53 of the object-side surface 51 of the fifth lens element 50 is concave, the aberration caused by the first lens element 10 and the second lens element 20 can be improved, which is beneficial to the convergence of imaging rays. When the fifth lens element 50 has negative refracting power or the optical axis region 46 of the image-side surface 42 of the fourth lens element 40 is convex, the edge aberration of the image plane can be improved. When the object moves from infinity to macro, the optical imaging lens 1 correspondingly forms the first and second focusing states to achieve the purpose of focusing. However, when the two focusing states meet the condition of (TTL*ΔHFOV)/ΔG≤19.000 degrees, the system length of the optical imaging lens 1 can be fixed, and good imaging quality can be maintained in the focusing process, in which the preferable range of (TTL*ΔHFOV)/ΔG is 0.750 degrees≤(TTL*ΔHFOV)/ΔG≤19.000 degrees.

3. When the optical axis region 36 of the image-side surface 32 of the third lens element 30 is convex, the periphery region 44 of the object-side surface 41 of the fourth lens element 40 is convex, and the fifth lens element 50 has negative refracting power, it can improve the center and edge aberrations caused by the first lens element 10 and the second lens element 20, and facilitate the convergence of imaging rays. When the object moves from infinity to macro, the optical imaging lens 1 correspondingly forms the first and second focusing states to achieve the purpose of focusing. However, when the two focusing states meet the condition of (TTL*ΔHFOV)/ΔG≤19.000 degrees, the system length of the optical imaging lens 1 can be fixed, and good imaging quality can be maintained in the focusing process, in which the preferable range of (TTL*ΔHFOV)/ΔG is 0.750 degrees≤(TTL*ΔHFOV)/ΔG≤19.000 degrees.

4. When the optical axis region 36 of the image-side surface 32 of the third lens element 30 is convex, and the fifth lens element 50 has negative refracting power, it can improve the center and edge aberrations caused by the first lens element 10 and the second lens element 20, and facilitate the convergence of imaging rays. When the object moves from infinity to macro, the optical imaging lens 1 correspondingly forms the first and second focusing states to achieve the purpose of focusing. However, if the two focusing states further meet the condition of (TTL*ΔHFOV)/ΔG≤15.000 degrees, in addition to maintaining good imaging quality in the focusing process, the adjustment of the air gap between the two focusing states is more conducive to shortening the system length of the optical imaging lens 1, in which the preferable range of (TTL*ΔHFOV)/ΔG is 0.750 degrees≤(TTL*ΔHFOV)/ΔG≤15.000 degrees.

5. The optical imaging lens 1 of the present invention has a front lens group 81 and a rear lens group 82, the front lens group 81 and the rear lens group 82 each have at least two lens elements. When the object moves from infinity to macro, the rear lens group 82 moves along the optical axis to make the optical imaging lens 1 form the first and second focusing states to achieve the purpose of focusing, and the optical imaging lens 1 can be kept in a fixed system length. When the effective focal lengths of the two focusing states meet the condition of EFL/EFLA≤1.500, the optical imaging lens 1 can keep a small volume, and can also make the object have good imaging quality at different object distances. The preferable range of EFL/EFLA is 1.000≤EFL/EFLA≤1.500.

6. When the refracting power of the front lens group 81 of the optical imaging lens 1 of the present invention is positive and the refracting power of the rear lens group 82 is positive or negative, the positive refracting power of the front lens group 81 converges imaging rays, and the distance between the front lens group 81 and the rear lens group 82 can be adjusted by moving the rear lens group 82 along the optical axis, so that the objects with different object distances have good imaging quality.

7. The optical image lens 1 of that present invention can form the first and second focusing states, so that when the object moves from infinity to 40 mm to 55 mm away from the optical imaging lens 1 of the present invention, it can be successfully focused and imaged with good imaging quality.

8. When the focal length of each lens of the present invention satisfies the range or configuration relationship listed in Table 1 below, it is beneficial to forming lens elements and improving assembly yield.

TABLE 1

| Relationships | Preferable range |
|---|---|
| \|f1/f2\| ≤ 1.500 | — |
| f4/f5 ≤ −1.500 | −12.500 ≤ f4/f5 ≤ −1.500 |
| f4/f3 ≤ 17.000 | 0.000 ≤ f4/f3 ≤ 17.000 |
| f3/f5 ≤ 0.000 | −1.000 ≤ f3/f5 ≤ 0.000 |

9. When the lens element's materials satisfy the conditions shown in Table 2 below, the chromatic aberration and spherical aberration produced in the focusing process at different object distances can be effectively suppressed, so that the optical imaging lens 1 has good resolution in different focusing states.

TABLE 2

| Relationships | Preferable range |
|---|---|
| (V1 + V3)/V2 ≥ 3.400 | 3.400 ≤ (V1 + V3)/V2 ≤ 5.200 |
| (V3 + V5)/V4 ≥ 3.400 | 3.400 ≤ (V3 + V5)/V4 ≤ 5.200 |
| V2 + V3 + V4 ≤ 130.000 | 90.000 ≤ V2 + V3 + V4 ≤ 130.000 |

10. When the image height of the optical imaging lens 1 is matched with the thickness and air gaps of a specific lens element, the optical imaging lens 1 can maintain good imaging quality when the configuration relationships listed in Table 3 below are satisfied.

TABLE 3

| Relationships | Preferable range |
|---|---|
| ImgH/(T4 + G45 + T5) ≥ 0.900 | 0.900 ≤ ImgH/(T4 + G45 + T5) ≤ 1.800 |
| ImgH/(T2 + G23) ≥ 2.800 | 2.800 ≤ ImgH/(T2 + G23) ≤ 5.000 |

11. When the first and second focusing states of the optical imaging lens 1 satisfy AAG/ΔG≤5.000, by adjusting the air gap between the lens elements, it can ensure that the optical imaging lens 1 can maintain good imaging quality in both focusing states, and the preferable range is 0.250≤AAG/ΔG≤5.000.

12. In order to ensure the imaging quality, reduce the volume of the lens, and at the same time consider the difficulty of manufacturing, the air gap between the lens elements or the thicknesses of the lens elements can be appropriately shortened or maintained at a certain ratio. Therefore, if the numerical limits of the following conditions shown in Table 4 are satisfied, the better configuration can be obtained.

TABLE 4

| Relationships | Preferable range |
|---|---|
| TTL/(G34 + BFL) ≤ 3.500 | 1.600 ≤ TTL/(G34 + BFL) ≤ 3.500 |
| TL/(T1 + T3) ≤ 5.000, The longitudinal spherical aberration can be corrected when TL/(T1 + T3) ≤ 3.300 is further satisfied. | 2.000 ≤ TL/(T1 + T3) ≤ 5.000, and the more preferred range is 2.000 ≤ TL/(T1 + T3) ≤ 3.300 |
| ALT/(G23 + G45) ≥ 1.800, When ALT/(G23 + G45) ≥ 4.700 is further satisfied, it is more beneficial to control the system length of the optical imaging lens. | 1.800 ≤ ALT/(G23 + G45) ≤ 14.000, and the more preferred range is 4.700 ≤ ALT/(G23 + G45) ≤ 14.000 |
| (T1 + G12)/T5 ≤ 2.700 | 0.400 ≤ (T1 + G12)/T5 ≤ 2.700 |
| TTL/EFL ≤ 2.000 | 0.850 ≤ TTL/EFL ≤ 2.000 |
| TL/AAG ≥ 2.000 | 2.000 ≤ TL/AAG ≤ 8.700 |
| ALT/(T1 + G12 + T2) ≥ 1.800 | 1.800 ≤ ALT/(T1 + G12 + T2) ≤ 5.800 |
| T3/(G23 + G45) ≥ 0.400 When T3/(G23 + G45) ≥ 1.000 is further satisfied, it is more beneficial to control the system length of the optical imaging lens. | 0.400 ≤ T3/(G23 + G45) ≤ 4.000, and the more preferred range is 1.000 ≤ T3/(G23 + G45) ≤ 4.000 |
| TTL/ALT ≤ 2.800 | 1.700 ≤ TTL/ALT ≤ 2.800 |
| BFL/(T3 + G34) ≤ 3.800 | 0.500 ≤ BFL/(T3 + G34) ≤ 3.800 |
| (T2 + T4 + G45)/T5 ≤ 1.800 | 1.000 ≤ (T2 + T4 + G45)/T5 ≤ 1.800 |
| ALT/Tmin ≥ 10.000 | 10.000 ≤ ALT/Tmin ≤ 16.000 |
| Tmax/Tavg ≤ 2.200 | 1.200 ≤ Tmax/Tavg ≤ 2.200 |
| TTL/(Tmax + Tmin) ≤ 7.000 | 3.600 ≤ TTL/(Tmax + Tmin) ≤ 7.000 |

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a better imaging quality, a smaller volume or a better fabrication yield to overcome the drawbacks of prior art. And by use of plastic material for the lens element of the present invention can further reduce the weight and cost of the optical imaging lens.

The numerical range within the maximum and minimum values obtained from the combination proportional relationship of the optical parameters disclosed in various embodiments of the present invention can be implemented accordingly.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens sequentially comprises a first lens element, a second lens element, a third lens element, a fourth lens element and a fifth lens element from an object side to an image side along an optical axis, and the first lens element to the fifth lens element each comprise an object-side surface facing toward the object side and allowing imaging rays to pass through as well as an image-side surface facing toward the image side and allowing the imaging rays to pass through, wherein when an object moves from infinity to macro, the optical imaging lens correspondingly forms a first focusing state and a second focusing state to achieve the purpose of focusing, wherein:

an optical axis region of the image-side surface of the third lens element is convex;

the fifth lens element has negative refracting power, an optical axis region of the object-side surface of the fifth lens element is concave, and an optical axis region of the image-side surface of the fifth lens element is concave;

wherein lens elements included by the optical imaging lens are only the five lens elements described above, and the optical imaging lens satisfies the relationships: 0.750 degrees≤(TTL*ΔHFOV)/ΔG≤19.000 degrees and TTL/ALT≤2.800, wherein TTL is a distance from the object-side surface of the first lens element to an image plane along the optical axis, ΔHFOV is an absolute value of the difference of the half field of view of the optical imaging lens in the first focusing state and the second focusing state, ΔG is $|AAG_1-AAG_2|$, wherein $AAG_1$ is a sum of four air gaps from the first lens element to the fifth lens element along the optical axis when the optical imaging lens is in the first focusing state, $AAG_2$ is a sum of four air gaps from the first lens element to the fifth lens element along the optical axis when the optical imaging lens is in the second focusing state, ALT is a sum of thicknesses of the five lens elements from the first lens element to the fifth lens element along the optical axis, and wherein T2 is a thickness of the second lens element along the optical axis, T4 is a thickness of the fourth lens element along the optical axis, T5 is a thickness of the fifth lens element along the optical axis, G45 is an air gap between the fourth lens element and the fifth lens element along the optical axis, and the optical imaging lens satisfies the relationship: (T2+T4+G45)/T5≤1.800.

2. An optical imaging lens sequentially comprises a first lens element, a second lens element, a third lens element, a fourth lens element and a fifth lens element from an object side to an image side along an optical axis, and the first lens element to the fifth lens element each comprise an object-side surface facing toward the object side and allowing imaging rays to pass through as well as an image-side surface facing toward the image side and allowing the imaging rays to pass through, wherein when an object moves from infinity to macro, the optical imaging lens correspondingly forms a first focusing state and a second focusing state to achieve the purpose of focusing, wherein:

an optical axis region of the image-side surface of the third lens element is convex;

the fifth lens element has negative refracting power, an optical axis region of the object-side surface of the fifth lens element is concave;

wherein lens elements included by the optical imaging lens are only the five lens elements described above, and the optical imaging lens satisfies the relationships: 0.750 degrees≤(TTL*ΔHFOV)/ΔG≤19.000 degrees and TTL/ALT≤2.800, wherein TTL is a distance from the object-side surface of the first lens element to an image plane along the optical axis, ΔHFOV is an absolute value of the difference of the half field of view of the optical imaging lens in the first focusing state and the second focusing state, ΔG is $|AAG_1-AAG_2|$, wherein $AAG_1$ is a sum of four air gaps from the first lens element to the fifth lens element along the optical axis when the optical imaging lens is in the first focusing state, $AAG_2$ is a sum of four air gaps from the first lens element to the fifth lens element along the optical axis when the optical imaging lens is in the second focusing state, ALT is a sum of thicknesses of the five lens elements from the first lens element to the fifth lens element along the optical axis, and wherein T2 is a thickness of the second lens element along the optical axis, T4 is a thickness of the fourth lens element along the optical axis, T5 is a thickness of the fifth lens element along the optical axis, G45 is an air gap between the fourth lens element and the fifth lens element along the optical axis, and the optical imaging lens satisfies the relationship: (T2+T4+G45)/T5≤1.800.

3. The optical imaging lens of claim 2, wherein G34 is an air gap between the third lens element and the fourth lens element along the optical axis, BFL is a distance from the image-side surface of the fifth lens element to the image plane along the optical axis, and the optical imaging lens satisfies the relationship: TTL/(G34+BFL)≤3.500.

4. The optical imaging lens of claim 2, wherein TL is a distance from the object-side surface of the first lens element to the image-side surface of the fifth lens element along the optical axis, T1 is a thickness of the first lens element along the optical axis, T3 is a thickness of the third lens element along the optical axis, and the optical imaging lens satisfies the relationship: TL/(T1+T3)≤3.300.

5. The optical imaging lens of claim 2, wherein ALT is a sum of thicknesses of the five lens elements from the first lens element to the fifth lens element along the optical axis, G23 is an air gap between the second lens element and the third lens element along the optical axis, G45 is an air gap between the fourth lens element and the fifth lens element along the optical axis, and the optical imaging lens satisfies the relationship: ALT/(G23+G45)≥4.700.

6. The optical imaging lens of claim 2, wherein T1 is a thickness of the first lens element along the optical axis, T5 is a thickness of the fifth lens element along the optical axis, G12 is an air gap between the first lens element and the second lens element along the optical axis, and the optical imaging lens satisfies the relationship: (T1+G12)/T5≤2.700.

7. The optical imaging lens of claim 2, wherein ImgH is an image height of the optical imaging lens, T4 is a thickness of the fourth lens element along the optical axis, T5 is a thickness of the fifth lens element along the optical axis, G45 is an air gap between the fourth lens element and the fifth lens element along the optical axis, and the optical imaging lens satisfies the relationship: ImgH/(T4+G45+T5)≥0.900.

8. The optical imaging lens of claim 2, wherein V1 is an Abbe number of the first lens element, V2 is an Abbe number of the second lens element, V3 is an Abbe number of the third lens element, and the optical imaging lens satisfies the relationship: (V1+V3)/V2≥3.400.

9. The optical imaging lens of claim 2, wherein V3 is an Abbe number of the third lens element, V4 is an Abbe number of the fourth lens element, V5 is an Abbe number of the fifth lens element, and the optical imaging lens satisfies the relationship: (V3+V5)/V4≥3.400.

10. The optical imaging lens of claim 2, wherein EFL is an effective focal length of the first focusing state, and the optical imaging lens satisfies the relationship: TTL/EFL≤2.000.

11. The optical imaging lens of claim 2, wherein TL is a distance from the object-side surface of the first lens element to the image-side surface of the fifth lens element along the optical axis, AAG is a sum of four air gaps from the first lens element to the fifth lens element along the optical axis, and the optical imaging lens satisfies the relationship: TL/AAG≥2.000.

12. The optical imaging lens of claim 2, wherein ALT is a sum of thicknesses of the five lens elements from the first lens element to the fifth lens element along the optical axis, T1 is a thickness of the first lens element along the optical axis, T2 is a thickness of the second lens element along the optical axis, G12 is an air gap between the first lens element and the second lens element along the optical axis, and the optical imaging lens satisfies the relationship: ALT/(T1+G12+T2)≥1.800.

13. The optical imaging lens of claim 2, wherein T3 is a thickness of the third lens element along the optical axis, G23 is an air gap between the second lens element and the third lens element along the optical axis, G45 is an air gap between the fourth lens element and the fifth lens element along the optical axis, and the optical imaging lens satisfies the relationship: T3/(G23+G45)≥1.000.

14. The optical imaging lens of claim 2, wherein ImgH is an image height of the optical imaging lens, T2 is a thickness of the second lens element along the optical axis, G23 is an air gap between the second lens element and the third lens element along the optical axis, and the optical imaging lens satisfies the relationship: ImgH/(T2+G23)≥2.800.

15. An optical imaging lens sequentially comprises a first lens element, a second lens element, a third lens element, a fourth lens element and a fifth lens element from an object side to an image side along an optical axis, and the first lens element to the fifth lens element each comprise an object-side surface facing toward the object side and allowing imaging rays to pass through as well as an image-side surface facing toward the image side and allowing the imaging rays to pass through, wherein when an object moves from infinity to macro, the optical imaging lens correspondingly forms a first focusing state and a second focusing state to achieve the purpose of focusing, wherein:

an optical axis region of the image-side surface of the third lens element is convex;

the fifth lens element has negative refracting power;

wherein lens elements included by the optical imaging lens are only the five lens elements described above, and the optical imaging lens satisfies the relationships: 0.750 degrees≤(TTL*ΔHFOV)/ΔG≤19.000 degrees and TTL/ALT≤2.800, wherein TTL is a distance from the object-side surface of the first lens element to an image plane along the optical axis, ΔHFOV is an absolute value of the difference of the half field of view of the optical imaging lens in the first focusing state and the second focusing state, ΔG is $|AAG_1-AAG_2|$, wherein $AAG_1$ is a sum of four air gaps from the first lens element to the fifth lens element along the optical axis when the optical imaging lens is in the first focusing state, $AAG_2$ is a sum of four air gaps from the first lens element to the fifth lens element along the optical axis when the optical imaging lens is in the second focusing state, ALT is a sum of thicknesses of the five lens elements from the first lens element to the fifth lens element along the optical axis, and wherein T2 is a thickness of the second lens element along the optical axis, T4 is a thickness of the fourth lens element along the optical axis, T5 is a thickness of the fifth lens element along the optical axis, G45 is an air gap between the fourth lens element and the fifth lens element along the optical axis, and the optical imaging lens satisfies the relationship: (T2+T4+G45)/T5≤1.800.

16. The optical imaging lens of claim 15, wherein V2 is an Abbe number of the second lens element, V3 is an Abbe number of the third lens element, V4 is an Abbe number of the fourth lens element, and the optical imaging lens satisfies the relationship: V2+V3+V4≤130.000.

17. The optical imaging lens of claim 15, wherein BFL is a distance from the image-side surface of the fifth lens element to the image plane along the optical axis, T3 is a thickness of the third lens element along the optical axis, G34 is an air gap between the third lens element and the fourth lens element along the optical axis, and the optical imaging lens satisfies the relationship: BFL/(T3+G34)≤3.800.

18. The optical imaging lens of claim 15, wherein AAG is a sum of four air gaps from the first lens element to the fifth lens element along the optical axis, and the optical imaging lens satisfies the relationship: AAG/ΔG≤5.000.

* * * * *